(12) United States Patent
Takane et al.

(10) Patent No.: US 8,891,034 B2
(45) Date of Patent: Nov. 18, 2014

(54) LIQUID CRYSTAL OPTICAL ELEMENT AND OPTICAL PICKUP APPARATUS

(75) Inventors: Yoshiharu Takane, Iruma (JP); Shinya Sato, Kodaira (JP); Nobuhiro Sato, Kodaira (JP)

(73) Assignee: Citizen Holdings Co., Ltd., Tokyo (JP)

( * ) Notice: Subject to any disclaimer, the term of this patent is extended or adjusted under 35 U.S.C. 154(b) by 709 days.

(21) Appl. No.: 12/413,414

(22) Filed: Mar. 27, 2009

(65) Prior Publication Data

US 2009/0244411 A1    Oct. 1, 2009

(30) Foreign Application Priority Data

Mar. 28, 2008 (JP) ................................. 2008-087921
Dec. 3, 2008 (JP) ................................. 2008-308537

(51) Int. Cl.
| G02F 1/133 | (2006.01) |
| G02F 1/13 | (2006.01) |
| G09G 3/36 | (2006.01) |
| G02B 5/18 | (2006.01) |
| G11B 7/1369 | (2012.01) |
| G11B 7/1353 | (2012.01) |

(52) U.S. Cl.
CPC ............ *G11B 7/1353* (2013.01); *G02B 5/1828* (2013.01); *G11B 7/1369* (2013.01)
USPC .................................... 349/33; 349/1; 345/94

(58) Field of Classification Search
None
See application file for complete search history.

(56) References Cited

U.S. PATENT DOCUMENTS

| 6,577,376 | B1 * | 6/2003 | Shih ............................... 349/202 |
| 6,690,500 | B2 * | 2/2004 | Ogasawara et al. ............ 359/245 |
| 6,882,482 | B2 * | 4/2005 | Ogasawara .................... 359/665 |
| 7,542,397 | B2 * | 6/2009 | Ogasawara et al. ....... 369/112.02 |
| 2006/0262425 | A1 * | 11/2006 | Sato et al. ...................... 359/738 |
| 2008/0151736 | A1 * | 6/2008 | Hamaoka et al. ......... 369/112.02 |
| 2008/0181084 | A1 * | 7/2008 | Sasabe et al. ............. 369/112.02 |

FOREIGN PATENT DOCUMENTS

| JP | 09-304748 | 11/1997 |
| JP | 2004-281026 A | 10/2004 |
| JP | 2006-338840 | 12/2006 |
| JP | 2007207354 A * | 8/2007 |

OTHER PUBLICATIONS

Notice of Reasons for Rejection of counterpart Japanese Patent Application No. 2008-087921, mailing date: Feb. 7, 2012 (3 pages).
* cited by examiner

*Primary Examiner* — Sarah Hahm
(74) *Attorney, Agent, or Firm* — Finnegan, Henderson, Farabow, Garrett & Dunner, L.L.P.

(57) ABSTRACT

A liquid crystal optical element having a crystal liquid optical element adapted to positively function as a diffraction element and an optical pickup apparatus including the liquid crystal optical element are disclosed. A transparent electrode having a diffraction pattern is arranged on one of a pair of transparent substrates. A liquid crystal panel has a transparent opposed electrode arranged on the other one of the pair of the transparent substrates. A driving unit generates a phase difference distribution in the liquid crystal layer by generating a potential difference between the transparent electrode and the transparent opposed electrode and causes the liquid crystal panel to function as a diffraction element for diffracting the incoming light beam transmitted therethrough. The diffraction pattern or the transparent opposed electrode is divided into a plurality of regions. The driving unit adjusts the potential difference for each of the regions.

14 Claims, 33 Drawing Sheets

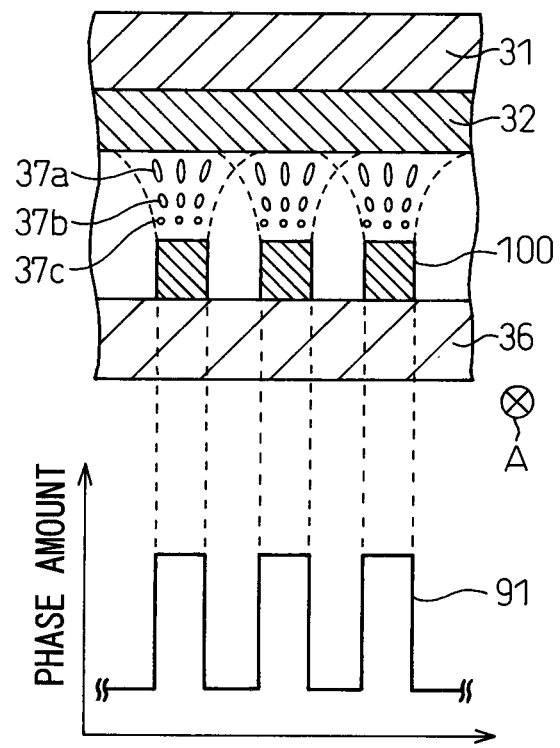

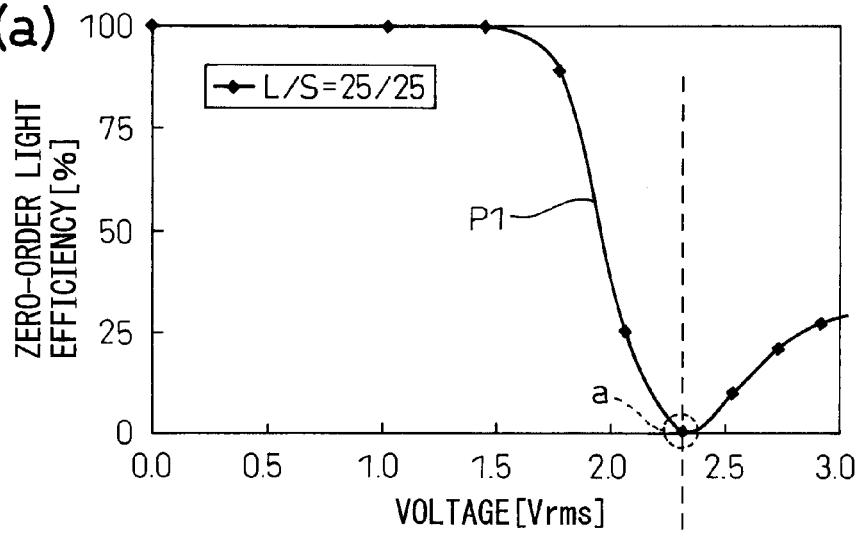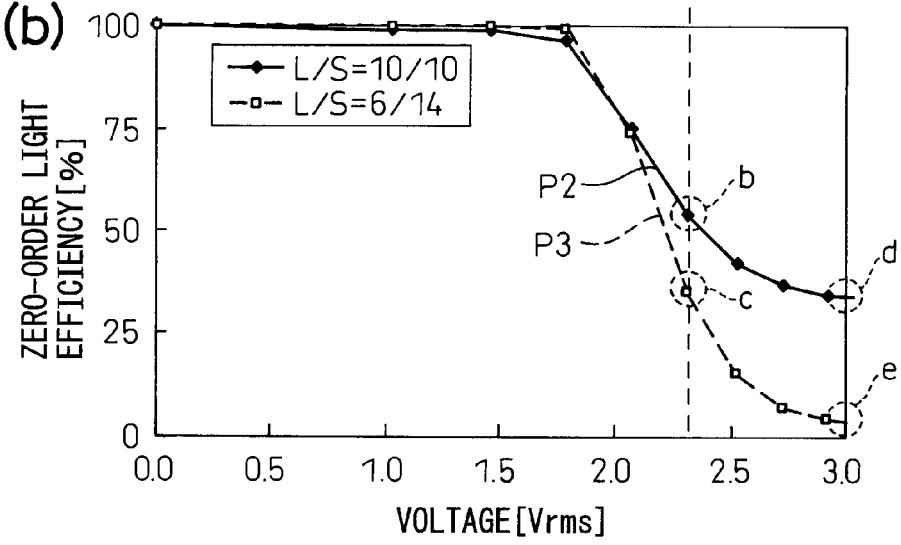

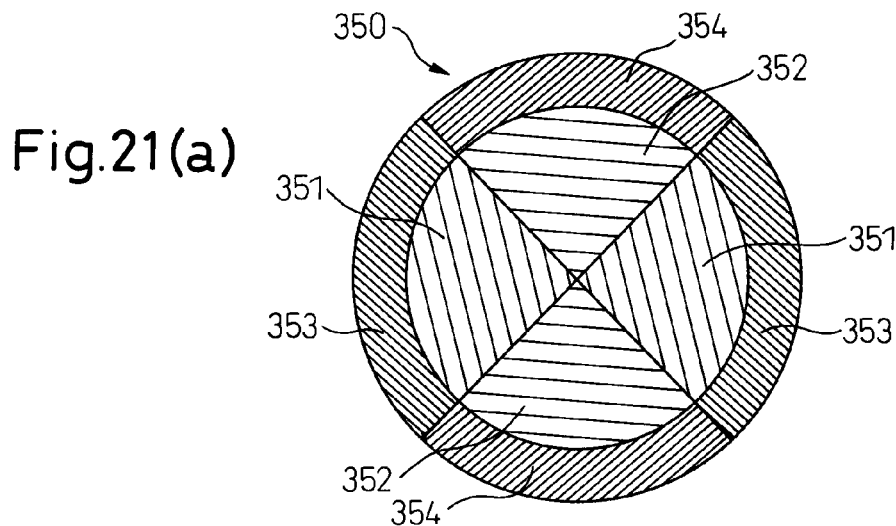
Fig.21(a)
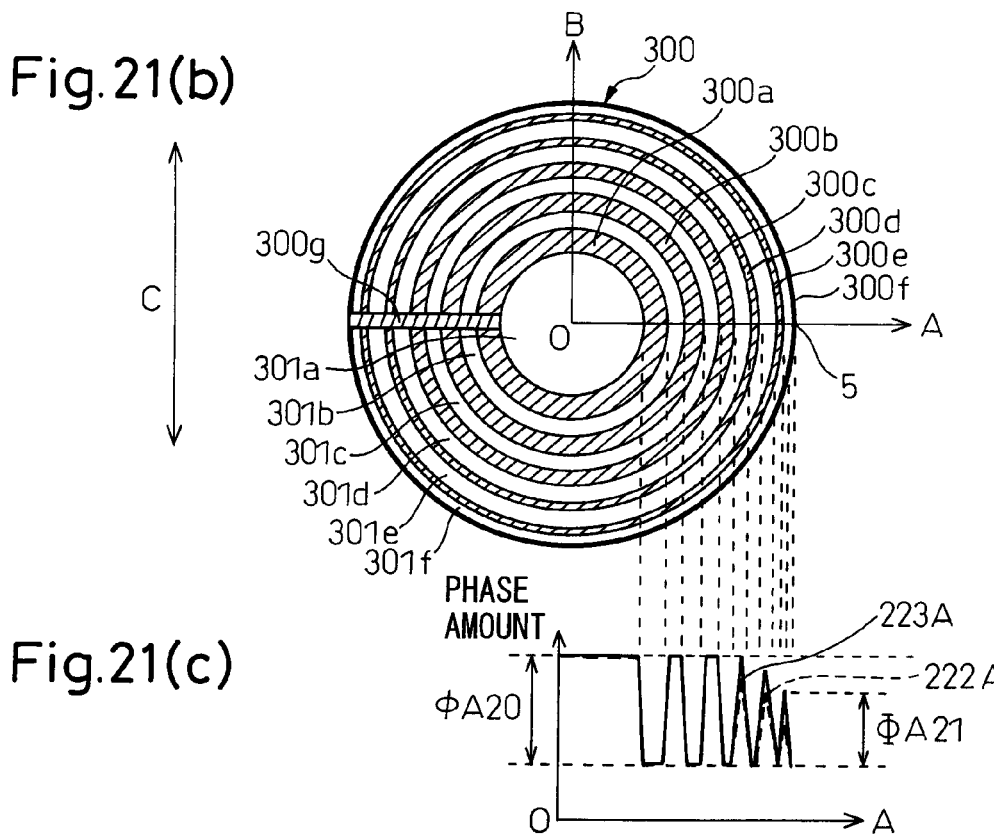
Fig.21(b)
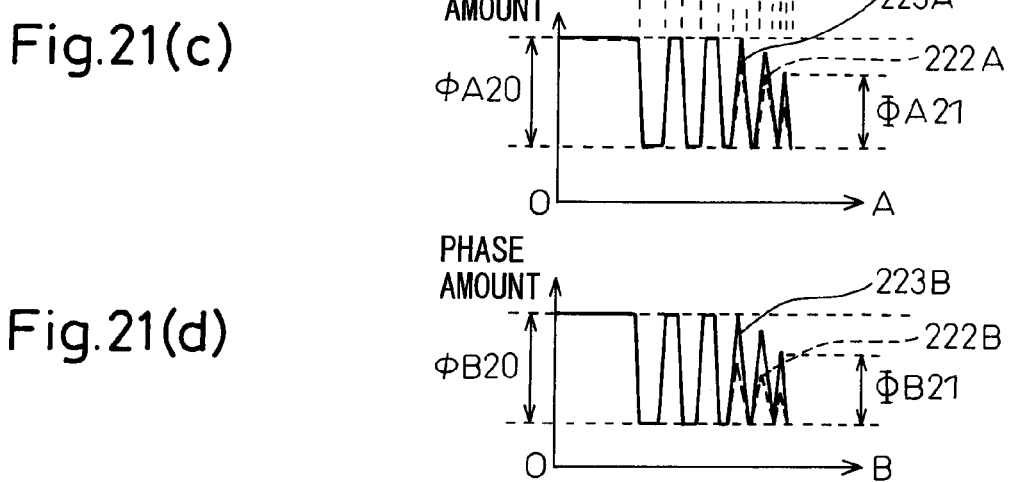
Fig.21(c)
Fig.21(d)

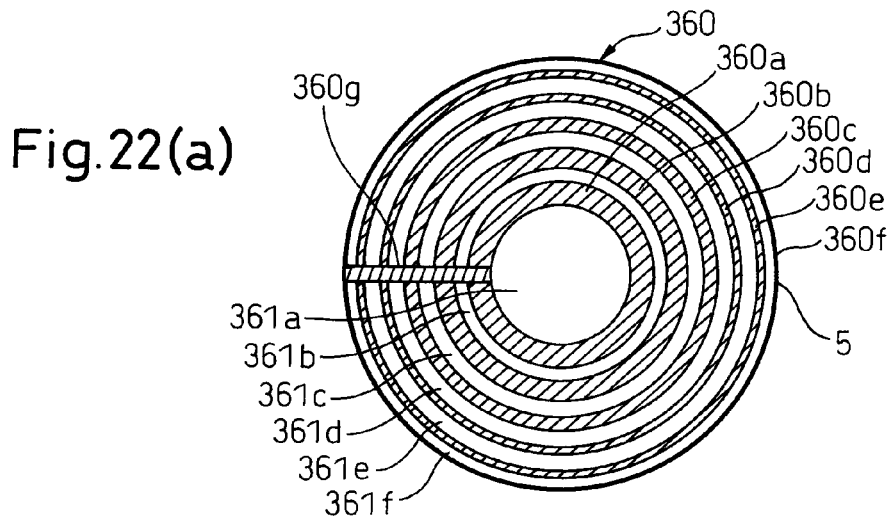
Fig.22(a)
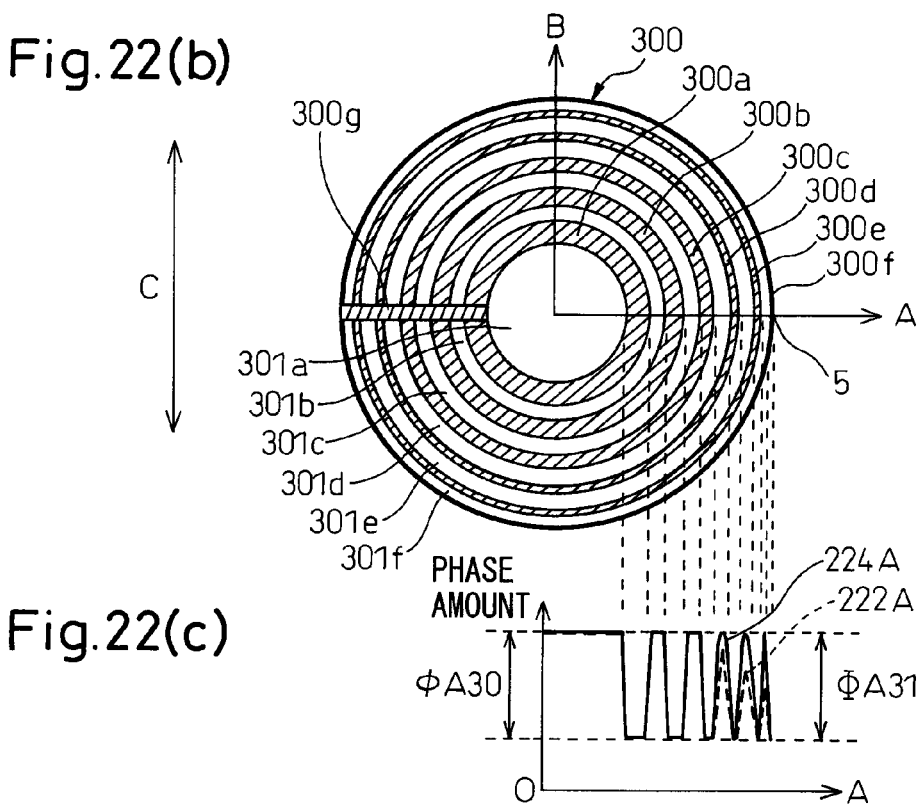
Fig.22(b)
Fig.22(c)
Fig.22(d)

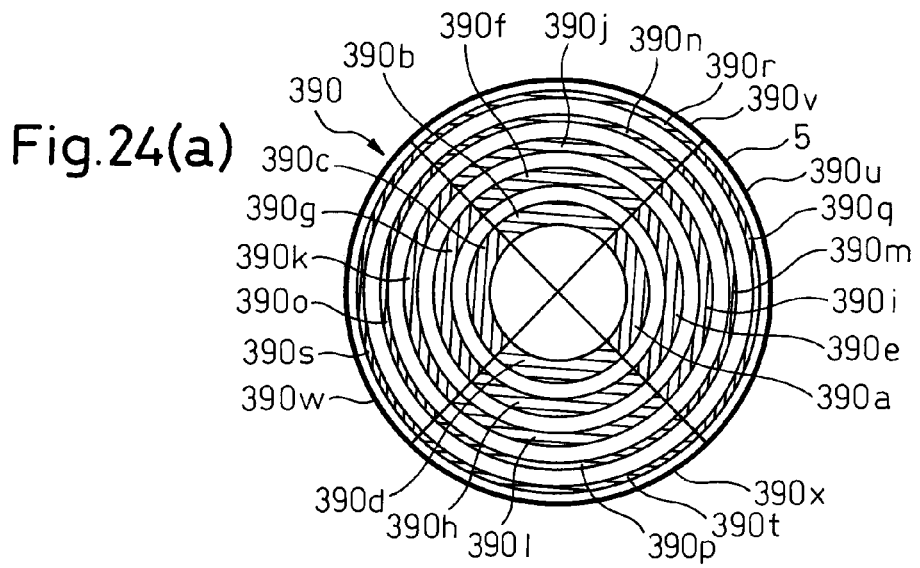
Fig.24(a)
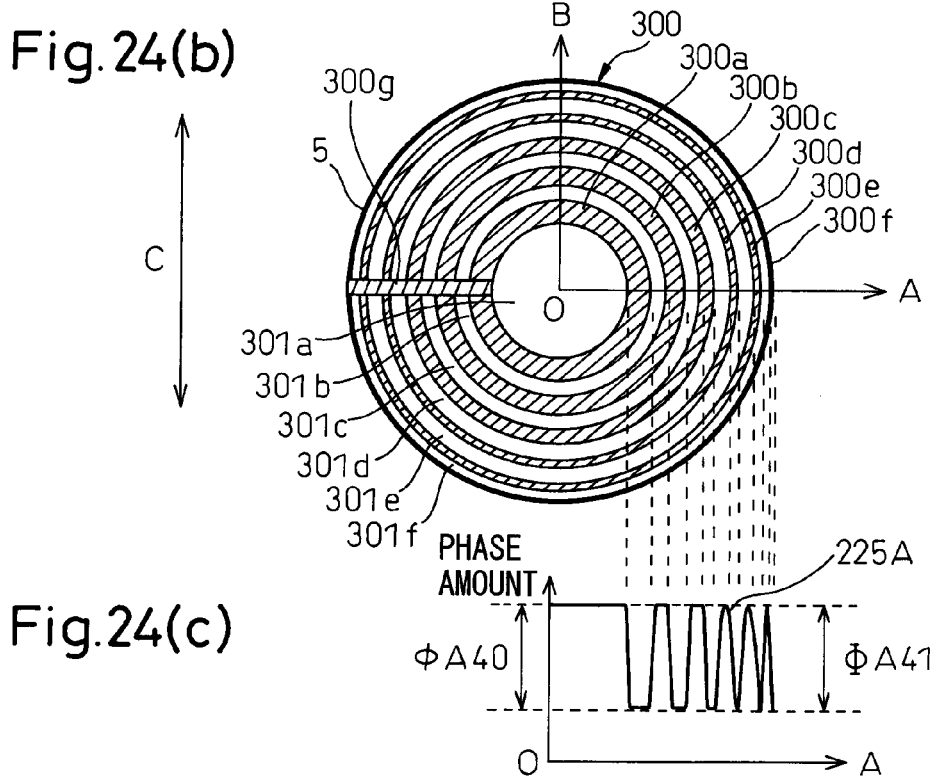
Fig.24(b)
Fig.24(c)
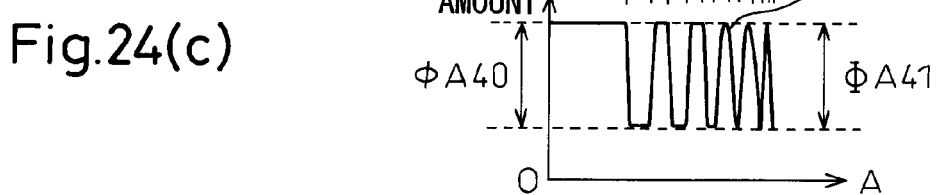
Fig.24(d)
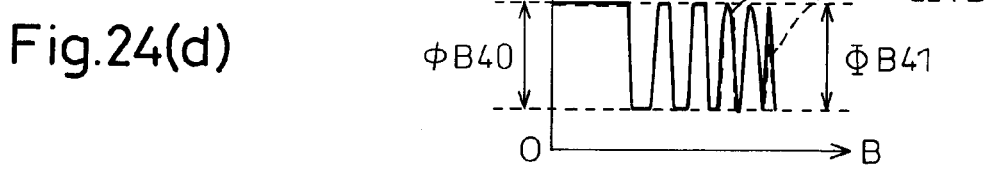

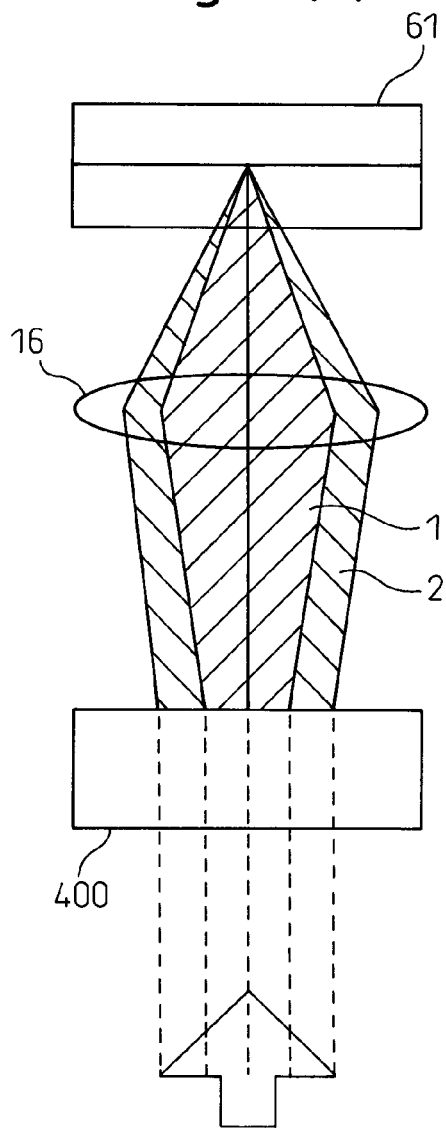
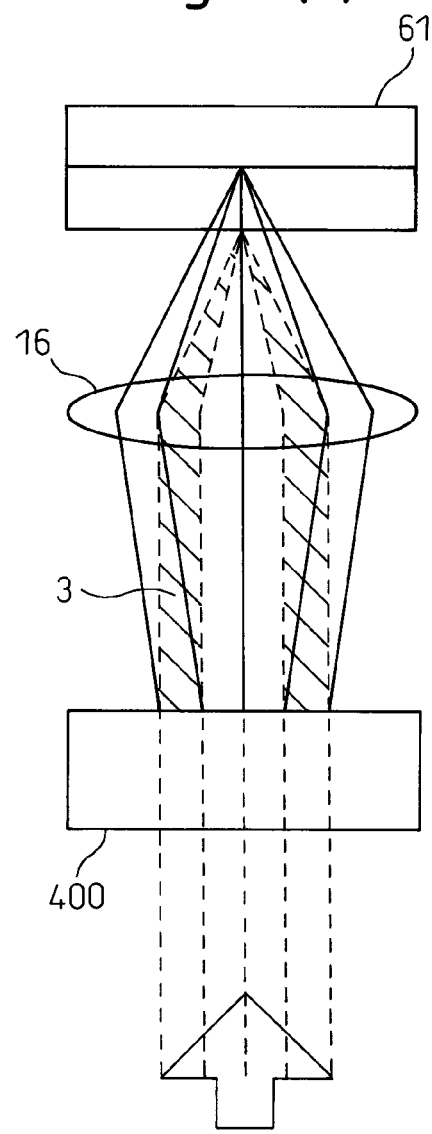

LIQUID CRYSTAL OPTICAL ELEMENT AND OPTICAL PICKUP APPARATUS

This application is a new U.S. patent application that claims benefit of JP 2008-087921, filed on Mar. 28, 2008 and JP 2008-308537, filed on Dec. 3, 2008, the entire content of JP 2008-087921 and JP 2008-308537 are incorporated herein by reference.

BACKGROUND OF THE INVENTION

1. Field of the Invention

This invention relates to a liquid crystal optical element and an optical pickup apparatus.

2. Description of the Related Art

A method is known in which the beam reflected from an optical recording medium is split by a beam splitter and applied to a photodetector, and utilizing the zero-order light and the primary light entering the beam splitter, the FE (focus error) signal and the TE (tracking error) signal are obtained (for example, Patent Document 1).

Patent Document 1, in place of the beam splitter, describes a beam splitter having three types of regions and a photodetector corresponding to the beam splitter. The beam splitter transmits the greater part of the incident beam and generates the zero-order light, and by transmitting a part of the light amount, generates the primary light from each of the three types of the regions. The beam splitter described in Patent Document 1 is a diffraction grating actually formed with a plurality of grooves, and used by being fixedly arranged in the light path of the optical beam.

Incidentally, in the optical pickup apparatus used for both write and read operations on a CD or DVD on the one hand and write and read operations on a Blu-ray disk on the other hand, the red beam (660 nm) for CD or DVD an the blue beam (405 nm) for the Blu-ray disc may share the same light path. In such a case, photodetectors usable for the respective light beams are required, which in turn requires a plurality of corresponding beam splitters for radiating a plurality of split beams onto the photodetectors.

For this purpose, however, a mechanism is required to put a plurality of beam splitters in and out of the beam light path, thereby inconveniently increasing the cost while at the same time making it impossible to reduce the size of the apparatus.

Also, demand has arisen for what is called a liquid crystal lens with variable focal length to reproduce, record and erase information on and from optical recording media different in the thickness of the protective layer such as CD, DVD and Blu-ray disc or an optical recording medium having multilayer recording surfaces using a common objective lens. In the optical magnification variable mechanism used for a conventional digital camera or the like, a lens moving mechanism is essential, which requires both a large space and a high cost. In the liquid crystal lens, on the other hand, no movable parts are required, and therefore, a magnification variable mechanism can be realized both in a small space and at a low cost.

In view of this, a technique is known in which the radius of curvature of the spherical component of the corrugated surface shape of the optical beam is changed using the transparent electrode having a plurality of concentrically arranged band-shaped pattern electrodes in the split spatial light modulator of liquid crystal type (for example, Patent Document 2). The transmission wave surface transmitted through the split spatial light modulator is subjected to the stepped phase modulation by a plurality of concentrically arranged band-shaped pattern electrodes to thereby generate the primary diffraction light. Incidentally, in order for the transmission wave surface passed through the split spatial optical modulator to generate the primary diffraction light, a stepped phase modulation having a phase difference of about $\lambda/2$ is required.

By using the split spatial light modulator described in Patent Document 2, the focal point of the objective lens can be substantially changed, and therefore, a plurality of optical recording media or an optical recording medium having a multilayer recording surface can be processed with a common objective lens.

Even by use of a transparent electrode having a plurality of band-shaped pattern electrodes arranged concentrically, however, the stepped phase modulation having a phase difference of about $\lambda/2$ is difficult to realize in the entire range of the effective light fluxes.

Patent Document 1: JP-A-2004-281026 (FIGS. 12, 13, 18 and 19)

Patent Document 2: JP-A-2006-338840 (FIG. 2)

SUMMARY OF THE INVENTION

An object of this invention is to provide a liquid crystal optical element and an optical pickup apparatus aimed at solving the problems described above.

Another object of the invention is to provide a liquid crystal optical element functioning positively as a diffraction element and an optical pickup apparatus having such a liquid crystal optical element.

Still another object of the invention is to provide a liquid crystal optical element usable by switching to a diffraction element and a nondiffraction element when using the light beam having a plurality of wavelengths and an optical pickup apparatus using such a liquid crystal optical element.

According to the invention, a liquid crystal optical element includes a liquid crystal panel including a liquid crystal layer provided between a pair of transparent substrates, a transparent electrode arranged on one of the pair of the transparent substrates and having a diffraction pattern, and a transparent opposed electrode arranged on the other one of the pair of the transparent substrates, and a driving unit for generating a potential difference between the transparent electrode and the transparent opposed electrode thereby to generate a phase difference distribution in the liquid crystal layer and thus causing the liquid crystal panel to function as a diffraction element for diffracting the incoming light beam transmitted therethrough, wherein the driving unit divides the plurality of the diffraction pattern or the transparent opposed electrode into a plurality of regions and adjusts the potential difference for each region.

According to the invention, an optical pickup apparatus includes a light source for emitting the light beam, a liquid crystal panel including a liquid crystal layer provided between a pair of transparent substrates, a transparent electrode arranged on one of the pair of the transparent substrates and having a diffraction pattern, and a transparent opposed electrode arranged on the other one of the pair of the transparent substrates, a driving unit for generating a potential difference between the transparent electrode and the transparent opposed electrode to thereby generate a phase difference distribution in the liquid crystal layer thus causing the liquid crystal panel to function as a diffraction element for diffracting the incoming light beam transmitted therethrough, and a photodetector for receiving the light diffracted by the liquid crystal panel, wherein the diffraction pattern or the transparent opposed electrode is divided into a plurality of regions, and the driving unit adjusts the potential difference for each of the plurality of regions.

According to the invention, an optical pickup apparatus includes a first light source for emitting a first light beam, a second light source for emitting a second light beam, a liquid crystal panel having a liquid crystal layer provided between a pair of transparent substrates, a transparent electrode arranged on one of the pair of the transparent substrates and having a diffraction pattern, and a transparent opposed electrode arranged on the other one of the pair of the transparent substrates, a liquid crystal optical element having a driving unit for generating a potential difference between the transparent electrode and the transparent opposed electrode, a switching unit with the driving unit to cause the liquid crystal layer to function as a diffraction element for diffracting the incoming light beam of the first light beam transmitted by generating a phase difference distribution in the liquid crystal panel when the first light beam is emitted from the first light source on the one hand, and to cause the liquid crystal layer to function as a nondiffraction element when the second light beam is emitted from the second light source, and a photodetector for receiving the diffraction light diffracted by the liquid crystal panel when the first light beam is emitted from the first light source, wherein the diffraction pattern or the transparent opposed electrode is divided into a plurality of regions, and the driving unit adjusts the potential difference for each of the plurality of regions.

According to this invention, the liquid crystal panel is used as a diffraction element, and therefore, the optical pickup apparatus can be reduced in both cost and size.

Also, according to this invention, the liquid crystal panel can be controlled to produce diffraction light similar to a diffraction grating physically formed of grooves.

Further, according to this invention, in the case where a high-density optical recording medium is used, the liquid crystal panel can be used by switching as a diffraction grating in the case where a high-density optical recording medium is used on the one hand and as a nondiffraction element in the case where a CD or DVD is used on the other hand.

Now, the configuration and the operation of the split spatial light modulator are explained.

FIG. 25(a) is a diagram for explaining the configuration of the transparent electrode in the liquid crystal panel 400, and FIG. 25(b) is a sectional view taken along line B'-B' of one of the transparent substrates making up the liquid crystal panel shown in FIG. 25(a).

As shown in FIG. 25, the transparent substrate 216 is formed with a transparent electrode 215 including a plurality of band-shaped pattern electrodes 215a to 215f. Also, a gap region 255a is formed at the central part of the transparent substrate 216, and the band-shaped pattern electrode 215a, the gap region 255b, the band-shaped pattern electrode 215b, the gap region 255c, the band-shaped pattern electrode 215c, the gap region 255d, the band-shaped pattern electrode 215d, the gap region 255e, the band-shaped pattern electrode 215e, the gap region 255f and the band-shaped pattern electrode 215f are formed in that order toward the periphery. The band-shaped pattern electrodes 215a to 215f are bundled by a leading electrode 215g so that power can be supplied to the transparent electrode 215 from an external source. The band-shaped pattern electrodes 215a to 215f and the gap regions 255a to 255f between the band-shaped pattern electrodes are so set that the nearer the peripheral part away from the central part, the smaller the electrode width and the gap width.

Next, the method of setting the band-shaped pattern electrodes and the gap regions in the liquid crystal panel 400 is explained.

FIG. 26 is a diagram for explaining the configuration of the transparent electrode.

In the liquid crystal panel 400, the liquid crystal layer is held by the band-shaped pattern electrodes 215a to 215f formed on the transparent opposed electrode (non-segmented electrode) described later and the transparent substrate, and by generating a potential difference between these electrodes in opposed relation to each other, the phase amount of the light beam entering the liquid crystal layer can be changed.

Let λ be the wavelength of the light beam, f be the focal length, and m the number of the band-shaped pattern electrodes as counted from the center. Then, the pitch $r_m$ of the mth band-shaped pattern electrode is given as $$r_m = (2 \times m \times f \times \lambda)^{1/2} \quad (1)$$

The outermost peripheral radius $r_{ms}$ of the gap region formed in the pitch and the radius $r_{me}$ up to the band-shaped pattern electrode can be expressed as $$r_{ms} = ((2m-1) \times f \times \lambda)^{1/2} \quad (2)$$

$$r_{me} = ((2m) \times f \times \lambda)^{1/2} \quad (3)$$

From Equations (2) and (3) above, the width of the gap region 255a is given as $r_{1s}$, the width of the band-shaped pattern electrode 215a as $(r_{1e}-r_{1s})$, the width of the gap region 255b as $(r_{2s}-r_{1e})$, the width of the band-shaped pattern electrode 215b as $(r_{2e}-r_{2s})$, the width of the gap region 255c is given as $(r_{3s}-r_{2e})$, the width of the band-shaped pattern electrode 215c as $(r_{3e}-r_{3s})$, the width of the gap region 255d as $(r_{4s}-r_{3e})$, the width of the band-shaped pattern electrode 215d as $(r_{4e}-r_{4s})$, the width of the gap region 255e as $(r_{5s}-r_{4e})$, the width of the band-shaped pattern electrode 215e as $(r_{5e}-r_{5s})$, the width of the gap region 255f as $(r_{6s}-r_{5e})$ and the width of the band-shaped pattern electrode 215f as $(r_{6e}-r_{5s})$. Thus, it is understood that the width of the band-shaped pattern electrode decreases progressively toward the peripheral part and so does the gap width between the band-shaped pattern electrodes.

FIG. 27(a) is a diagram showing the transparent opposed electrode 212 of the liquid crystal panel 400, and FIG. 27(b) is a diagram showing the transparent electrode 215 having a diffraction pattern, that is, an electrode element, formed of a plurality of the band-shaped pattern electrodes arranged concentrically.

As shown in FIG. 27(a), the transparent opposed electrode 212 of the liquid crystal panel 400 is a non-segmented solid electrode over the whole surface thereof. As shown in FIG. 27(b), the transparent electrode 215 in opposed relation to the transparent opposed electrode 212, as explained with reference to FIGS. 25 and 26, includes the band-shaped pattern electrodes 215a to 215f and the leading electrode 215g. These band-shaped pattern electrodes 215a to 215f and the gap regions 255a to 255f are formed within the effective light flux 5. Incidentally, the arrow C in FIG. 27(b) indicates the direction in which the liquid crystal layer is oriented in the liquid crystal panel 400 having the transparent electrode 215.

FIG. 27(c) is a diagram showing the phase amount distribution generated in the direction OA in FIG. 27(b) in the case where a predetermined potential difference is uniformly generated between the diffraction patten formed on the transparent electrode 215 shown in FIG. 27(b) and the transparent opposed electrode 212. Also, FIG. 27(d) is a diagram showing the phase amount distribution generated in the direction OB in FIG. 27(b) in the case where a predetermined potential difference is uniformly generated between the diffraction patten formed on the transparent electrode 215 shown in FIG. 27(b) and the transparent opposed electrode 212.

As shown in FIG. 27(c), in the direction OA substantially orthogonal to the orientation direction C, the phase amount distribution 221A is obtained in which the phase difference $\phi$A0 at the central part and the phase difference $\phi$A1 on the peripheral part are different from each other. Also, as shown in FIG. 27(d), in the direction OB substantially parallel to the orientation direction C, the phase amount distribution 221B results in which the phase difference $\phi$B0 at the central part and the phase difference $\phi$B1 on the peripheral part are different from each other. These phase differences hold the relation $\phi$A0>$\phi$B0, $\phi$A1>$\phi$B1.

As understood from the above, even in the configuration of the liquid crystal panel 400 for generating a predetermined potential difference uniformly between the transparent electrode 215 including a plurality of concentrically arranged band-shaped pattern electrodes 215a to 215f and the transparent opposed electrode 212, the phase difference distribution having the same phase difference cannot be generated in the transparent electrode 215 as a whole.

Next, the operation of the liquid crystal lens having the band-shaped pattern electrodes is explained.

FIG. 28 is a diagram for explaining the behavior of the liquid crystal molecules in various regions of the transparent electrode.

Actually, as described above, the band-shaped pattern electrodes and the gaps have a width reduced progressively toward the peripheral part. In the example shown in FIG. 28, however, a plurality of the band-shaped pattern electrodes having the same width are shown arranged at equal intervals for the convenience of explanation. In the liquid crystal panel 400 shown in FIG. 28, the non-segmented solid transparent opposed electrode 212 is arranged on the transparent substrate 211, the transparent electrode 215 having the plurality of the concentrically arranged band-shaped pattern electrodes is arranged on the transparent substrate 216, and the liquid crystal layer 217 is held between the transparent opposed electrode 212 and the transparent electrode 215.

FIG. 28(a) is a diagram for explaining the behavior of the liquid crystal molecules in the section at the central part of the plurality of the band-shaped pattern electrodes arranged concentrically in the direction OA in the liquid crystal panel 400 having the transparent electrode 215 shown in FIG. 27(b). FIG. 28(b) shows the phase amount distribution 231 corresponding to FIG. 28(a). The phase difference in the phase amount distribution 231 is $\phi$A0.

In FIG. 28(a), the band-shaped pattern electrodes are formed in the direction substantially parallel to the orientation direction C. In this case, assuming that a predetermined potential difference is generated between the transparent electrode 215 and the transparent opposed electrode 212, the liquid crystal molecules in the shape of long pins such as 217a, 217b, 217c, 217d and 217e shown in FIG. 28(a) arranged along the orientation direction C behave to gradually rise. As seen, in the gap region at the central part having a large width, few liquid crystal molecules excessively rise due to the field leakage 241 from the regions of the adjoining band-shaped pattern electrodes. As shown in FIG. 28(b), therefore, in the liquid crystal layer of this region, therefore, the rise of the liquid crystal molecules is understood to have a large difference between the gap region and the region of the band-shaped pattern electrodes.

FIG. 28(c) is a diagram for explaining the behavior of the liquid crystal molecules in the section of the peripheral part of the plurality of the band-shaped pattern electrodes arranged concentrically in the direction OA in the liquid crystal panel 400 having the transparent electrode 215 shown in FIG. 27(a). FIG. 28(d) shows the phase amount distribution 232 corresponding to FIG. 28(c). The phase difference in the phase amount distribution 232 is $\phi$A1.

In FIG. 28(c), the band-shaped pattern electrodes are formed in the direction substantially parallel to the orientation direction C. In this case, assuming that a predetermined potential difference is generated between the transparent electrode 215 and the transparent opposed electrode 212 like in FIG. 28(a), the liquid crystal molecules in the shape of long pins such as 217f, 217g, 217h, 217i and 217j arranged along the orientation direction C behave to gradually rise. In the peripheral part of the diffraction pattern, the gap width is so small that the liquid crystal molecules rise considerably under the effect of the field leakage 242 from the region of the adjoining band-shaped pattern electrodes. As a result, the difference in the rise of the liquid crystal molecules between the gap region and the region of the band-shaped pattern electrodes is smaller than in the case of FIG. 28(a).

As described above, in the peripheral part of the diffraction pattern, as compared with the central part (FIG. 28(a)), the liquid crystal molecules in the gap region as well as in the region of the band-shaped pattern electrodes excessively rise undesirably, and therefore, a sufficient phase difference cannot be secured in some parts between the gap region and the region of the band-shaped pattern electrodes. As a result, as indicated by the phase amount distribution 232, the phase difference has a smaller distribution than the phase amount distribution 231.

FIG. 28(e) is a diagram showing the behavior of the liquid crystal molecules in the case where the band-shaped pattern electrodes are formed in the direction OB (the direction orthogonal to the orientation direction C) in FIG. 27(b). FIG. 28(f) shows the phase amount distribution 233 corresponding to FIG. 28(e). The phase difference in the phase amount distribution 233 is $\phi$B0.

In this case, assuming that a predetermined potential difference is generated between the transparent electrode 215 and the transparent opposed electrode 212 as in FIG. 28(a), the liquid crystal molecules in the shape of long pins such as 217k, 217l, 217m, 217n and 217o arranged along the orientation direction C as shown in FIG. 28(e) behave to gradually rise. As seen, in the gap region at the central part having a large width, few liquid crystal molecules are affected by the field leakage 241 from the region of the adjoining band-shaped pattern electrodes. In this region, however, the orientation direction of the liquid crystal molecules and the direction in which the band-shaped pattern electrodes are arranged are substantially orthogonal to each other, and therefore, the liquid crystal molecules in the gap regions are caused to rise with the liquid crystal molecules in the regions of the adjoining band-shaped pattern electrodes. As compared with the case shown in FIG. 28(a), therefore, the difference in the rise of the liquid crystal molecules is small between the region of the band-shaped pattern electrodes and the gap region.

In this region, the direction of the pin-like liquid crystal molecules is different in spite of the same pitch of the band-shaped pattern electrodes as in FIG. 28(a). As shown in FIG. 28(e), therefore, the difference is small in the rise of the liquid crystal molecules between the region of the band-shaped pattern electrodes and the gap region. Thus, a sufficient phase difference cannot be secured in some part between the band-shaped pattern electrodes and the gap region. As shown in the phase amount distribution 233, therefore, the distribution is smaller in phase difference than the phase amount distribution 231. In this region, however, the liquid crystal molecules between the band-shaped pattern electrodes are less affected than in the region having a small pitch shown in FIG. 28(c). Therefore, the phase difference is larger than in the phase amount distribution 232.

FIG. 28(g) is a diagram for explaining the behavior of the liquid crystal molecules in the section of the peripheral part of the plurality of the band-shaped pattern electrodes arranged concentrically in the direction OB in the liquid crystal panel 400 having the transparent electrode 215 shown in FIG. 27(a). FIG. 28(h) shows the phase amount distribution 234 corresponding to FIG. 28(g). The phase difference in the phase amount distribution 234 is ϕB1.

In FIG. 28(g), the band-shaped pattern electrodes are formed in the direction substantially orthogonal to the orientation direction C. In this case, assuming that a predetermined potential difference similar to FIG. 28(a) is generated between the transparent electrode 215 and the transparent opposed electrode 212, the liquid crystal molecules in the shape of long pins such as 217p, 217q, 217r, 217s and 217t arranged along the orientation direction C gradually rise. In the peripheral part of the diffraction pattern, the width of the gap region is so small that the liquid crystal molecules rise considerably under the effect of the field leakage 242 from the adjoining band-shaped pattern electrodes. Also, since the orientation direction of the liquid crystal molecules is substantially orthogonal to the direction in which the band-shaped pattern electrodes are arranged, the liquid crystal molecules in the gap region are liable to rise excessively to higher than a predetermined position with the liquid crystal molecules in the regions of the adjoining band-shaped pattern electrodes. In this region, therefore, the difference in the rise of the liquid crystal molecules between the gap region and the region of the band-shaped pattern electrodes is smallest as compared with the cases of FIG. 28(a), FIG. 28(c) and FIG. 28(e).

In the peripheral part of the diffraction pattern, as compared with the central part (FIG. 28(e)), the pitch of the band-shaped pattern electrodes is narrow, and therefore, as shown in FIG. 28(g), the difference of the rise of the liquid crystal molecules is small between the region of the band-shaped pattern electrodes and the gap region. As shown in FIG. 28(h), therefore, a sufficient phase difference cannot be secured in some part between the region of the band-shaped pattern electrodes and the gap region. Specifically, as shown in the phase amount distribution 234, the distribution is small in phase difference as compared with the phase amount distribution 233 shown in FIG. 28(f). Incidentally, in the region shown in FIG. 28(g), the liquid crystal molecules are arranged substantially orthogonally with the band-shaped pattern electrodes and the pitch of the band-shaped pattern electrodes is small. As compared with the aforementioned three regions (FIG. 28(a), 28(c) and 28(e)), therefore, the phase difference is smallest.

As shown in FIG. 28(a) to FIG. 28(h), assume that the same potential difference is generated between the transparent electrode 215 and the transparent opposed electrode 212. In each region, a different phase amount distribution would be generated, and therefore, the stepped phase modulation having the phase difference of about λ/2 cannot be assured in the whole range of the effective light fluxes.

Next, the behavior of the light beam affected by the operation shown in FIG. 28 is explained.

FIG. 29 is a diagram for explaining the diffraction using the liquid crystal panel 400 having the transparent electrode 215 shown in FIG. 27(b). FIG. 29(a) shows the primary diffraction light diffracted by the liquid crystal panel 400, and FIG. 29(b) the zero-order light due to the liquid crystal panel 400.

In the case where the liquid crystal panel 400 having the transparent electrode as shown in FIG. 29(a) is caused to function as a diffraction element, the entire transmitted light should originally be emitted as the primary diffraction light and converged at a predetermined position of, for example, a middle-density optical recording medium 61 by the objective lens 16.

As explained with reference to FIG. 28, however, the stepped phase modulation having the phase difference of about λ/2 cannot be assured over the entire range of the effective light fluxes 5. The light passed through the peripheral part (the region shown in FIG. 28(c) or FIG. 28(g)) of the transparent electrode 215, for example, is not completely diffracted, but the zero-order light 3 would be generated undesirably as shown in FIG. 29(b). Although the light passed through the central part (the region shown in FIG. 28(a) or FIG. 28(e)) of the transparent electrode 215 is emitted as the ideal primary diffraction light 1 having the phase difference of λ/2, the light passed through the peripheral part of the transparent electrode 215, as shown in FIG. 29(b), is emitted by being separated into the primary diffraction light 2 and the zero-order light 3 (FIGS. 29(a) and 29(b)).

In the process, the zero-order light 3, which is not originally expected, is not converged at a predetermined position of the optical recording medium 61, thereby inconveniently resulting in a correspondingly lower light utilization rate.

In view of this, an object of this invention is to provide a liquid crystal optical element and an optical pickup apparatus aimed at solving the problems described above.

Another object of the invention is to provide a liquid crystal optical element positively functioning as a diffraction element capable of substantially changing the focal point of the objective lens and an optical pickup apparatus using such a liquid crystal optical element.

Still another object of the invention is to provide a liquid crystal optical element adapted for use by switching between the diffraction element and the nondiffraction element when using the light beam having a plurality of wavelengths, and an optical pickup apparatus having such a liquid crystal optical element.

According to this invention, there is provided a liquid crystal optical element including a liquid crystal panel having a liquid crystal layer held between a pair of transparent substrates, a transparent electrode having a first diffraction pattern including a plurality of band-shaped pattern electrodes arranged concentrically on one of the pair of the transparent substrates and a transparent opposed electrode arranged on the other one of the pair of the transparent substrates, wherein a potential difference is generated between the transparent electrode and the transparent opposed electrode to thereby generate a phase amount distribution in the liquid crystal layer while at the same time acting as a binary diffraction grating against a specified wavelength, thereby causing the liquid crystal panel to function as a diffraction lens for the light beam transmitted therethrough, wherein the band-shaped pattern electrodes are arranged at pitches expressed by $$(2 \times m \times f \times \lambda)^{1/2} \qquad (4)$$

where m is the number of the band-shaped pattern electrodes as counted from the center, f the focal length and λ the wavelength of the light beam used, and wherein the width of the band-shaped pattern electrodes and the width of the gap between the band-shaped pattern electrodes determined by Equation (4) above are set in such a manner as to maintain a constant diffraction efficiency in all the regions in which the light beam is subjected to phase modulation.

Further, in the liquid crystal optical element according to this invention, the width of the electrode formed on the outer peripheral region in all the regions where the light beam is phase modulated is preferably set to be decreased progressively toward the outside of the band-shaped pattern electrodes with respect to the width determined by Equation (4).

Further, in the liquid crystal optical element according to this invention, the transparent opposed electrode preferably has a second diffraction pattern including the concentrically arranged band-shaped pattern electrodes corresponding to the first diffraction pattern formed on the transparent electrode.

Furthermore, in the liquid crystal optical element according to this invention, the transparent opposed electrode is preferably divided into a plurality of parts by the dividing lines passing through the center of the band-shaped pattern electrodes.

According to this invention, there is provided an optical pickup apparatus comprising a light source for emitting a light beam, an objective lens for leading the light beam to an optical disk, and a liquid crystal optical element arranged in the light path of the light beam between the light source and the objective lens, wherein the liquid crystal optical element includes a liquid crystal panel having a liquid crystal layer held between a pair of transparent substrates, a transparent electrode having a first diffraction pattern including the band-shaped pattern electrodes arranged concentrically on one of the transparent substrates and a transparent opposed electrode arranged on the other one of the transparent substrates, wherein a potential difference is generated between the transparent electrode and the transparent opposed electrode to thereby generate a phase amount distribution in the liquid crystal layer while at the same time acting as a binary diffraction grating against a specified wavelength, thereby causing the liquid crystal panel to function as a diffraction lens for the light beam transmitted therethrough, wherein the band-shaped pattern electrodes are arranged at pitches expressed by $$(2 \times m \times f \times \lambda)^{1/2} \qquad (5)$$

where m is the number of the band-shaped pattern electrodes as counted from the center, f the focal length and λ the wavelength of the light beam used, and wherein the width of the band-shaped pattern electrodes and the width of the gap between the band-shaped pattern electrodes determined by Equation (5) above are set to maintain a constant diffraction efficiency in all the regions in which the light beam is phase modulated.

According to this invention, the liquid crystal panel can be properly rendered to function as a diffraction element capable of substantially changing the focal point of the objective lens.

Also, according to this invention, there are provided a liquid crystal optical element and an optical pickup apparatus high in light utilization rate.

Further, according to this invention, the liquid crystal panel can be used as a nondiffraction element with a high-density optical recording medium on the one hand and switched to a diffraction grating when used with a CD or the DVD on the other hand.

BRIEF DESCRIPTION OF THE DRAWINGS

These and other features and advantages of the present invention will be better understood by reading the following detailed description, taken together with the drawings wherein:

FIG. 20(a) is a diagram showing the change in the zero-order optical efficiency at the central part of the diffraction pattern of the liquid crystal panel 210, and FIG. 20(b) the change in the zero-order light efficiency in the outer peripheral part of the diffraction pattern of the liquid crystal panel 400;

FIG. 21(a) is a diagram showing the pattern of the transparent opposed electrode 350 formed on the transparent substrate 211, FIG. 21(b) the transparent electrode 300 having the same diffraction pattern as the configuration example shown in FIG. 17(c), FIG. 21(c) the phase amount distribution in the direction OA in FIG. 21(b), and FIG. 21(d) the phase amount distribution in the direction OB in FIG. 21(b);

FIG. 22(a) is a diagram showing an example of the pattern of still another transparent opposed electrode 360, FIG. 22(b) a pattern example of the transparent electrode 300, FIG. 22(c) the phase amount distribution in the direction OA in FIG. 22(b), and FIG. 22(d) the phase amount distribution in the direction OB in FIG. 22(b);

FIG. 24(a) shows an example of the pattern configuration of the transparent opposed electrode 390, FIG. 24(b) the transparent electrode 300 having a diffraction pattern, FIG. 24(c) the phase amount in direction OA shown in FIG. 24(b), and FIG. 24(d) the phase amount in direction OB shown in FIG. 24(b);

FIG. 29(a) shows the primary diffraction light diffracted by the liquid crystal panel 400, and FIG. 29(b) the zero-order light due to the liquid crystal panel 400.

DETAILED DESCRIPTION OF THE PREFERRED EMBODIMENTS

A liquid crystal optical element and an optical pickup apparatus according to the invention are explained below with reference to the drawings. It should be noted that the technical scope of the invention is not limited to the embodiments described herein and also covers the invention described in the appended claims and equivalents thereto.

Figure 1:
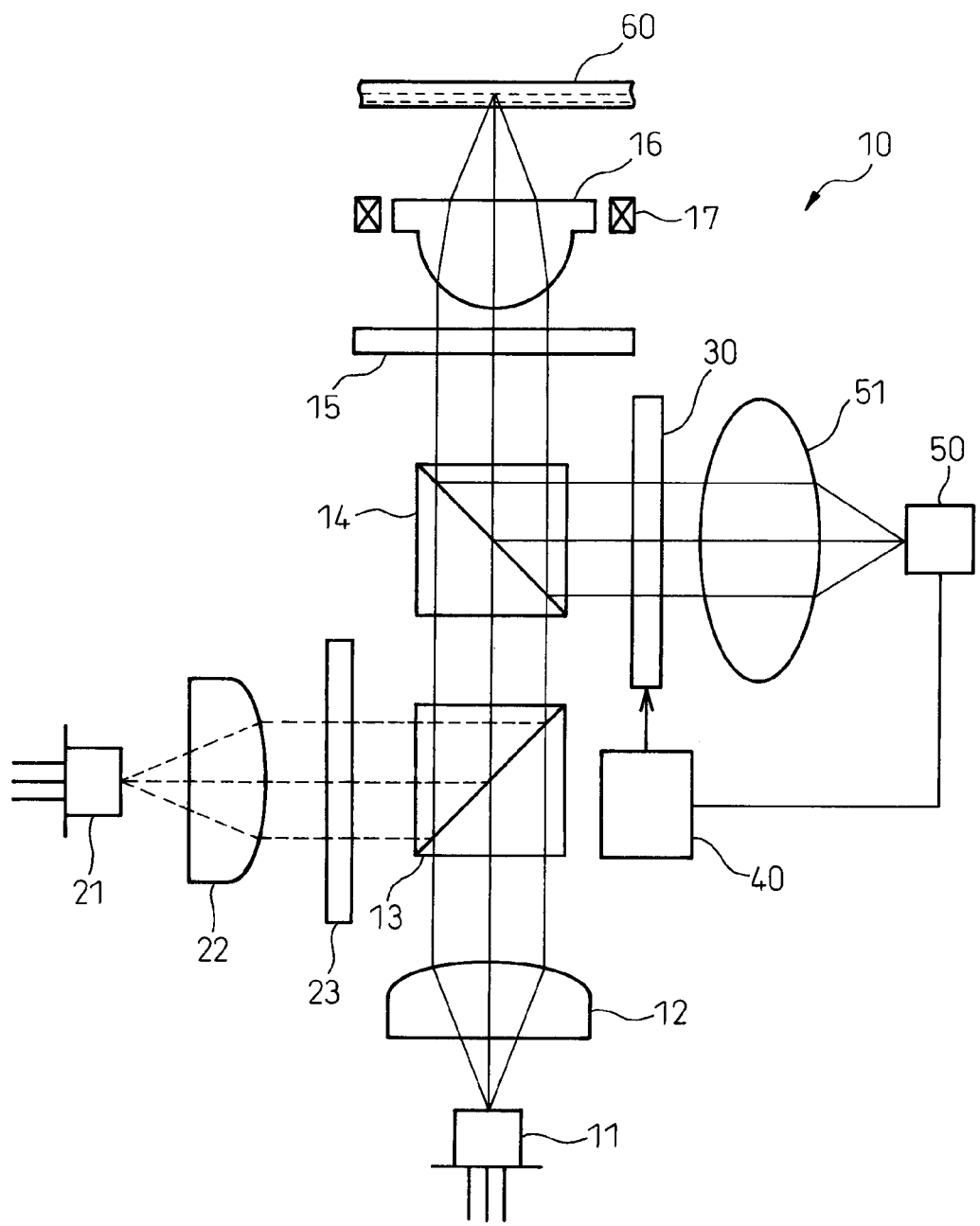
FIG. 1 is a diagram showing a general configuration of the optical pickup apparatus according to the invention.

FIG. 1 is a diagram showing a general configuration of the optical pickup apparatus according to the invention.

FIG. 1 represents a case in which data is reproduced from a high-density optical recording medium 60 such as a Blu-ray disc. In the optical pickup apparatus 10, the blue laser light having the wavelength of 405 nm emitted from a first light source 11 making up a semiconductor laser is converted into a substantially parallel light by a first collimate lens 12 and, through a half mirror 13 and a polarization beam splitter 14, enters a $\lambda/4$ plate 15. The light beam (outgoing light) converted from the linear polarization to the circular polarization in the $\lambda/4$ plate 15 is converged on the high-density optical recording medium 60 (the Blu-ray disc in this case) by an objective lens 16.

The light reflected from the high-density optical recording medium 60 is passed again through the objective lens 16, and through the $\lambda/4$ plate 15, converted from the circularly polarized light into the linearly polarized light having the direction of polarization orthogonal to the outgoing light. The light beam emitted from the $\lambda/4$ plate 15 is reflected on the polarization beam splitter 14 and enters the liquid crystal panel 30.

As described later, the liquid crystal panel 30 is so configured that a liquid crystal driving unit 40 generates a predetermined potential difference between a transparent electrode having a diffraction pattern and a transparent opposed electrode 32 thereby to generate a predetermined phase difference distribution. In this way, the liquid crystal panel 30 functions as a diffraction element. The light beam entering the liquid crystal panel 30, therefore, is diffracted into one zero-order diffraction light and three primary diffraction light and converged on a photodetector 50 through a convergence lens 51.

The photodetector 50, based on the converged diffraction light, outputs a FE (focus error) signal, a TE (tracking error) signal and a RF signal. In a control mechanism not shown, the driving mechanism 17 is controlled using the FE signal and the TE signal output from the photodetector 50 thereby to perform the focusing operation and the tracking operation of the objective lens 16. In this way, a predetermined position on the high-density optical recording medium 60 is kept tracked by the convergence spot through the objective lens 16. Also, in the control mechanism not shown, the information recorded in the high-density optical recording medium 60 is reproduced based on the RF signal output from the photodetector 50.

In writing the information on the high-density optical recording medium 60, the light beam emission from the first light source 11 is modulated in accordance with the recorded information, and while conducting the tracking and the focusing operation of the objective lens 16 using the FE and the TE signal output from the photodetector 50, the coloring matter or the like of the writable high-density optical recording medium 60 is decomposed, modified or altered by the thermal action of the laser light thereby to perform the write operation.

In reproducing the information from a low- or middle-density optical recording medium (not shown) such as a CD or DVD in the optical pickup apparatus 10 shown in FIG. 1, the red laser light having the wavelength of 660 nm emitted from the second light source 21 constituted of a semiconductor laser is converted into a substantially parallel light by a second collimate lens 2 and split into three beams by a diffraction element 23. The three beams split by the diffraction element 23 are reflected on the half mirror 13 and, through the polarization beam splitter 14, enters the λ/4 plate 15. The three beams (outgoing light) converted from the linearly polarized light into the circularly polarized light in the λ/4 plate 15 are converged on the CD or DVD (not shown) by the objective lens 16.

The diffraction element 23, which is actually a diffraction grating formed with a plurality of grooves, is fixedly arranged for use in the optical path of the light beam. Like in the liquid crystal panel 30, however, the liquid crystal layer may be used.

The three beams reflected from the CD or DVD are passed through the objective lens 16 again, and through the λ/4 plate 15, converted from the circularly polarized light into the linearly polarized light with the direction of polarization thereof orthogonal to the outgoing light. The three beams emitted from the λ/4 plate 15 are reflected from the polarization light beam splitter 14 and enter the liquid crystal panel 30.

The liquid crystal panel 30 is configured to function as a nondiffraction element as described later. The three beams that have entered the liquid crystal panel 30, therefore, are passed through the liquid crystal panel 30 as they are and converged on the photodetector 50 by the convergence lens 51.

The photodetector 50, based on the three beams thus converged, outputs the FE (focus error) signal, the TE (tracking error) signal and the RF signal. In the control mechanism not shown, the driving mechanism 17 is controlled using the FE signal and the TE signal output from the photodetector 50 thereby to perform the focusing operation and the tracking operation of the objective lens 16. In this way, a predetermined position on the CD or the DVD, as the case may be, is kept tracked by the convergence spot through the objective lens 16. Also, in the control mechanism not shown, the information recorded on the CD or the DVD is reproduced based on the RF signal output from the photodetector 50.

In writing the information in the low- or middle-density optical recording medium such as CD or DVD, the light beam emission from the second light source 21 is modulated in accordance with the recorded information, and while conducting the tracking and the focusing operation of the objective lens 16 using the FE signal and the TE signal output from the photodetector 50, the coloring matter or the like of the writable CD or DVD is decomposed, modified or altered by the thermal action of the laser light thereby to perform the operation to write the information.

Figure 2:
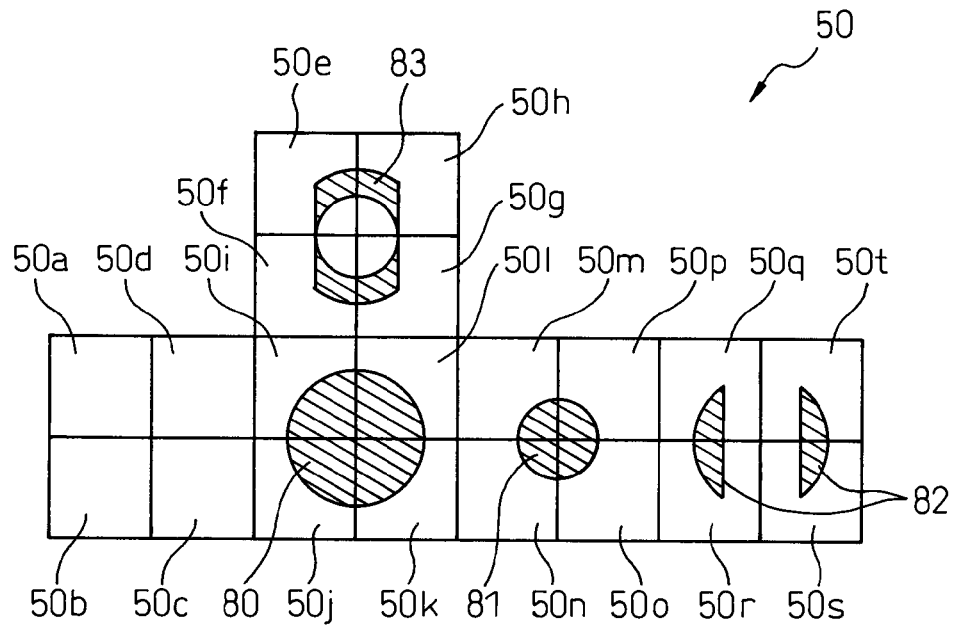
FIG. 2 is a diagram showing a photodetector using the high-density optical recording medium.

FIG. 2 is a diagram showing the photodetector in the case where the high-density optical recording medium 60 is used.

The photodetector 50 has a total of twenty light-receiving units 50a to 50t. The light-receiving units 50i to 50l are arranged to receive the zero-order diffraction light 80, the light-receiving units 50m to 50p the first primary diffraction light 81, the light-receiving units 50q to 50t the second primary diffraction light 82 and the light-receiving units 50e to 50h the third primary diffraction light 83. The light-receiving units 50a to 50t are configured to output the current values I50a to I50t, respectively, in accordance with the light received.

The FE signal, for example, can be determined by the calculation of (I50i+I50k)−(I50j+I50l). In similar fashion, the TE signal can be determined by the calculation of (I50q+I50r)−(I50s+I50t). Further, the spherical aberration error signal can be determined by calculating (I50m+I50o)−(I50n+I50p)−C×{(I50e+I50g+I50q+I50s)−(I50f+I50h+I50r+I50t)}, where C is a constant. Further, the RF signal can be determined by calculating I50i+I50j+I50k+I50l. Incidentally, these calculation formulae are only an example and other calculation formulae may alternatively be used.

Figure 3:
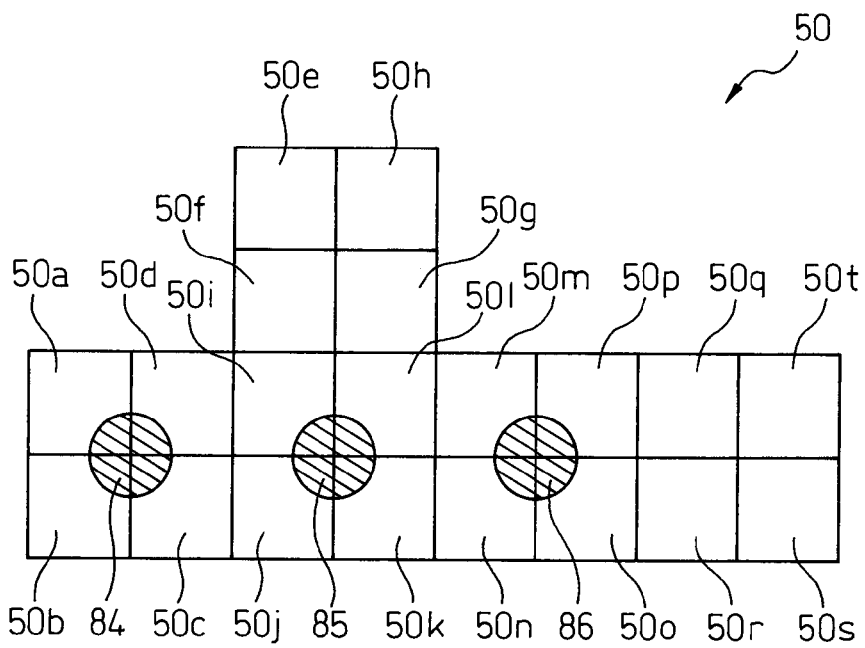
FIG. 3 is a diagram showing a photodetector 50 using a CD or a DVD.

FIG. 3 is a diagram showing the photodetector 50 in the case where a CD or DVD is used.

In this case, the photodetector 50 receives the three beams split by the diffraction element 23, and is arranged in such a manner that the light-receiving units 50a to 50d receive the minus one-order light 84, the light-receiving units 50i to 50l the zero-order light 85 and the light-receiving units 50m to 50p the minus one-order light 86.

The FE signal, for example, can be determined by the calculation of (I50i+I50k)−(I50j+I50l). In similar fashion, the TE signal can be determined by the calculation of [(I50i+I50j)−(I50k+I50l)]−C[(I50a+I50b+I50m+I50n)−(I50c+I50d+I50o+I50p)], where C is a constant. Further, the RF signal can be determined by calculating I50i+I50j+I50k+I50l. Incidentally, these calculation formulae are only an example and other calculation formulae may alternatively be used.

Figure 4:
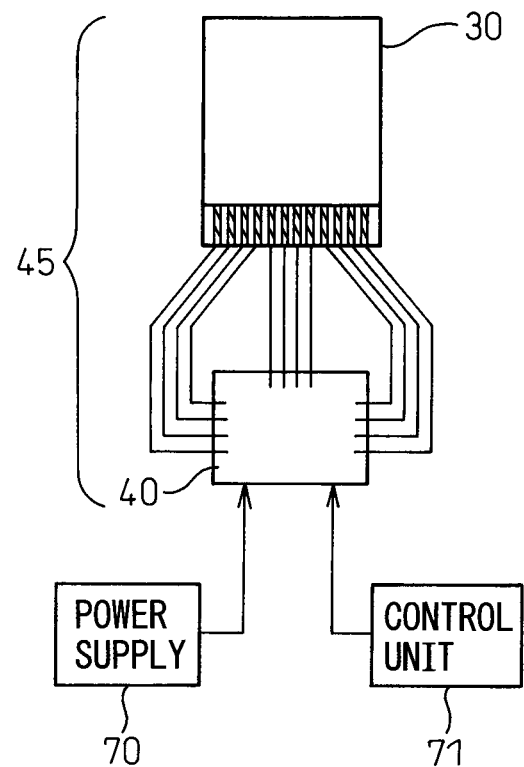
FIG. 4 is a diagram for explaining the method of driving the liquid crystal optical element.

FIG. 4 is a diagram for explaining the method of driving the liquid crystal panel 30.

The liquid crystal panel 30 is driven by a liquid crystal driving unit 40 connected to a power supply unit 70 and a control unit 71 configured of a ROM, a RAM, etc. The liquid crystal driving unit 40, based on the control signal from the control unit 71, adjusts the light amount of the liquid crystal panel 30, controls the switching operation in accordance with the recording medium (the high-density optical recording medium 60, CD or DVD) and also performs the on/off control operation. In this specification, the liquid crystal panel 30 combined with the liquid crystal driving unit 40 is referred to as a liquid crystal optical element 45.

Figure 5:
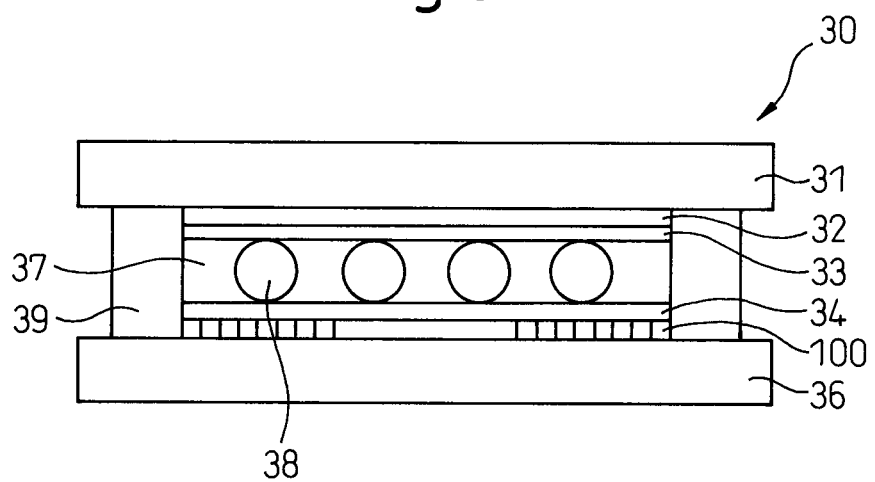
FIG. 5 is a sectional view schematically showing the liquid crystal panel 30.

FIG. 5 is a sectional view schematically showing the liquid crystal panel 30.

The liquid crystal panel 30 includes a first transparent substrate 31, a second transparent substrate 36, a seal member 39, a plurality of spacers arranged to hold the interval between the first transparent substrate 31 and the second transparent substrate 36, and a liquid crystal layer 37 sealed between the first and the second transparent substrates 31, 36 and the seal member 39. Also, a transparent opposed electrode (non-segmented solid electrode) 32 and a first orientation film 33 are formed on the first transparent substrate 31, while the transparent electrode 100 and a second orientation film 34 are formed on the second transparent substrate 36. By way of explanation, it should be noted that the diagram is plotted on a scale different from the actual one. The liquid crystal layer 37 is formed of nematic liquid crystal or the like subjected to the homogeneous orientation or the homeotropic orientation process.

The first and second transparent substrates 31, 36 are flexible and formed of polycarbonate resin having the thickness of 100 μm. Nevertheless, the first and second transparent substrates 31, 36 may alternatively be formed of a transparent glass substrate, modified acryl resin, polymethacryl resin, polyethersulfone resin, polyethylene terephthalate resin or norbornane resin. Also, the thickness of the first and second transparent substrates 31, 36 may alternatively be 50 μm to 250 μm.

The transparent opposed electrode 32 and the transparent electrode 100 are formed by sputtering on the first and second transparent substrates 31 and 36, respectively, by vapor deposition of a transparent conductive film of ITO having the thickness of about 0.03 μm, after which the unrequited parts are etched off.

Figure 6:
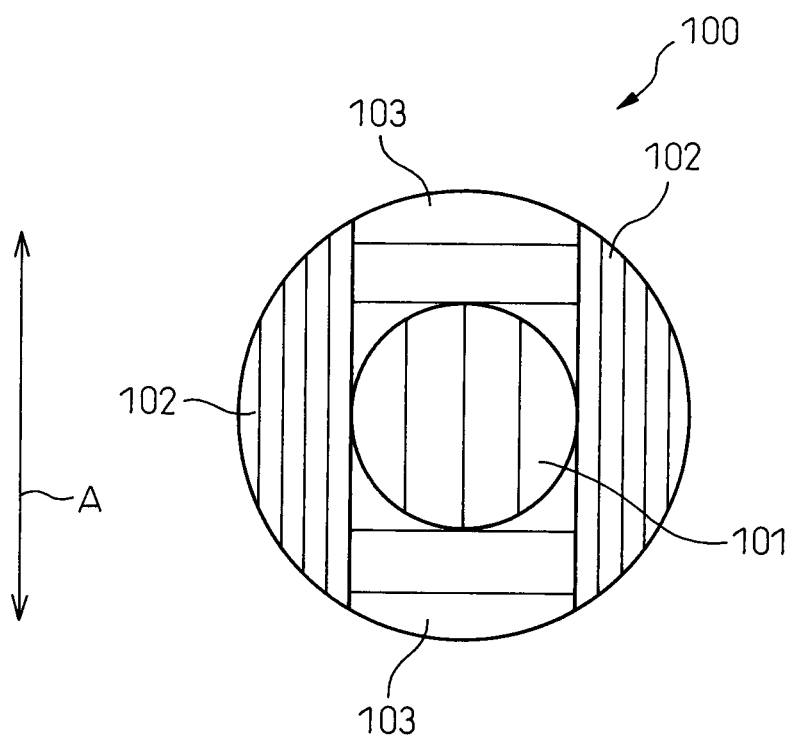
FIG. 6 is a diagram showing an example of the transparent electrode.

FIG. 6 is a diagram showing an example of the transparent electrode.

As shown in FIG. 6, the transparent electrode 100 of the liquid crystal panel 30 has three types of regions and is so configured that the effective diameter of the light beam reflected by the polarization light beam splitter 14 has substantially the same shape as the contour of the transparent electrode 100 shown in FIG. 6. Incidentally, the arrow A in FIG. 6 indicates the direction of orientation of the first orientation film 33 and the second orientation film 34 of the liquid crystal panel 30.

In the substantially elliptic first region 101 of the transparent electrode 100 corresponding to the central part of the light beam, a diffraction pattern having a plurality of band-shaped patterns of a predetermined width arranged at the pitches of s1 (for example, 10 μm) is formed in the same direction as the orientation direction A. Also, in the second region 102 of the transparent electrode 100, a diffraction pattern having a plurality of band-shaped patterns of a predetermined width arranged at the pitches of s2 (for example, 5 μm) (s2<s1) is formed in the same direction as the orientation direction A. Further, in the third region 103 of the transparent electrode 100, a diffraction pattern having a plurality of band-shaped patterns of a predetermined width arranged at the pitches of s1 is formed in the direction substantially orthogonal to the orientation direction A.

In the case where the high-density optical recording medium 60 is used, the liquid crystal panel 30 causes the liquid crystal driving unit 40 to generate a predetermined phase difference distribution and thus to function as a diffraction element. In that case, the light transmitted through the whole transparent electrode 100 is detected as the zero-order diffraction light, that is, diffraction pattern, 80 by the light-receiving units 50i to 50l of the photodetector 50. Similarly, the light diffracted by the first region 101 of the transparent electrode 100 is detected as the first primary diffraction light 81 by the light-receiving units 50m to 50p of the photodetector 50; the light diffracted by the second region 102 of the transparent electrode 100 is detected as the second primary diffraction light 82 by the light-receiving units 50q to 50t of the photodetector 50; and the light diffracted by the third region 103 of the transparent electrode 100 is detected as the third primary diffraction light 83 by the light-receiving units 50e to 50h of the photodetector 50.

FIG. 7 is a diagram for explaining the behavior of the liquid crystal molecules in each region of the transparent electrode.

FIG. 7(a) is a sectional view of the first region 101. A diffraction pattern including a plurality of band-shaped patterns of a predetermined width arranged at the pitches of s1 along the orientation direction A is formed in the first region 101 of the transparent electrode 100. Upon generation of a predetermined potential difference between the transparent electrode 100 and the transparent opposed electrode 32, the liquid crystal molecules in the shape of long pins such as 37a, 37b and 37c in FIG. 7(a) arranged along the orientation direction A rise gradually.

FIG. 7(b) shows the phase difference distribution 91 formed by the first region 101 of the transparent electrode 100 shown in FIG. 7(a). By forming the phase difference distribution 91 as shown in FIG. 7(b), the same effect is produced as if the diffraction grating corresponding to the phase difference distribution 91 as shown in FIG. 7(b) is formed in the first region 101, and the light passed through the particular region is diffracted.

Figure 7C:
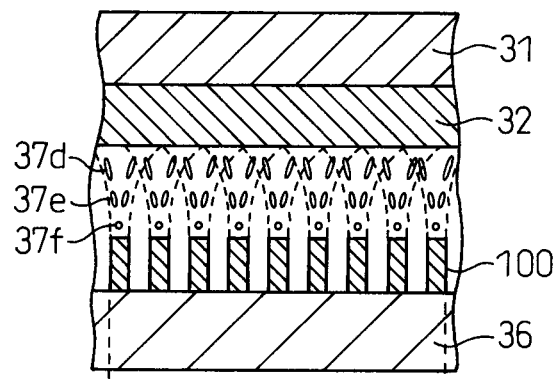
FIG. 7(a) is a sectional view of a first region 101.
FIG. 7(b) shows a phase difference distribution 91 formed by the first region 101 of the transparent electrode 100 shown in FIG. 7(a), FIG. 7(c) a sectional view of a second region 102, FIG. 7(d) a phase difference distribution 92 formed by the second region 102 of the transparent electrode 100 shown in FIG. 7(c), FIG. 7(e) a sectional view of a third region 103, and FIG. 7(f) a phase difference distribution 93 formed by the third region 102 of the transparent electrode 100 shown in FIG. 7(e)

FIG. 7(c) is a sectional view of the second region 102. In the second region 102 of the transparent electrode 100, a diffraction pattern is formed of a plurality of band-shaped patterns having a predetermined width arranged at pitches of s2 (s2<s1) in the direction substantially orthogonal to the orientation direction A. In this case, upon generation of a predetermined potential difference (the same potential difference as in FIG. 7(a)) between the transparent electrode 100 and the transparent opposed electrode 32, the liquid crystal molecules in the shape of long pins such as those designated by 37d, 37e and 37f in FIG. 7(b) arranged along the orientation direction A behave to rise.

Figure 7D:
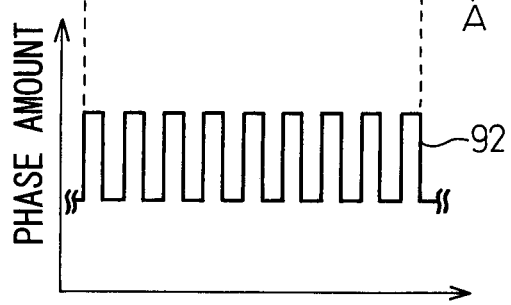

FIG. 7(d) shows the phase difference distribution 92 formed by the second region 102 of the transparent electrode 100 shown in FIG. 7(c). The second region 102 is affected by the lateral field between the patterns due to the narrow pitch s2, and therefore, the phase amount fails to sufficiently decrease in some part between the patterns. As shown by the phase difference distribution 92, as compared with the phase difference distribution 91, therefore, the distribution is generated with a small difference between the maximum and minimum values of the phase amount.

In the second region 102, therefore, the same effect is produced as if the diffraction grating corresponding to the phase difference distribution 92 shown in FIG. 7(d) is formed, so that the light passed through the particular region is subjected to diffraction.

Figure 7E:
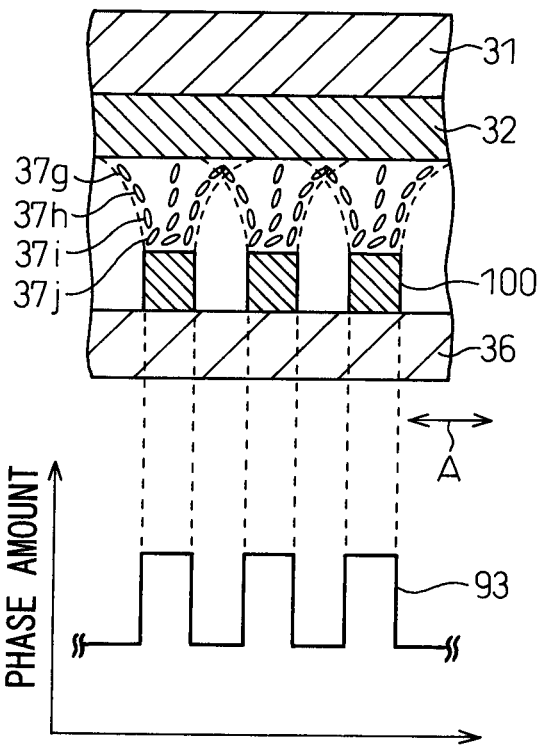

FIG. 7(e) is a sectional view of the third region 102. In the third region 103 of the transparent electrode 100, a diffraction pattern is formed of a plurality of band-shaped patterns having a predetermined width arranged at pitches of s1 in the direction substantially orthogonal to the orientation direction A. In this case, the liquid crystal molecules in the shape of long pins such as those designated by 37g, 37h and 37l in FIG. 7(e) arranged along the orientation direction A tend to rise upon generation of a predetermined potential difference (the same potential difference as in FIG. 7(a)) between the transparent electrode 100 and the transparent opposed electrode 32.

Figure 7F:
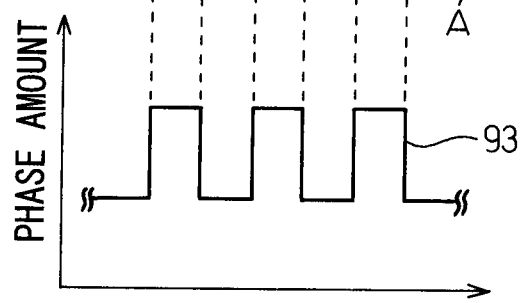

FIG. 7(f) shows the phase difference distribution 93 formed by the third region 102 of the transparent electrode 100 shown in FIG. 7(e). The third region 103, which has the same pitch s1 as the first region 101 but has a different direction of the liquid crystal molecules in the shape of long pins, is affected by the lateral field between the patterns, and therefore, the phase amount fails to decrease sufficiently in some part between the patterns. As a result, as indicated by the phase difference distribution 93, the distribution generated has a small difference between the maximum and minimum values of the phase amount as compared with the phase difference distribution 91.

In the third region 103, therefore, the same effect is produced as if the diffraction grating corresponding to the phase difference distribution 93 is formed as shown in FIG. 7(f), so that the light passed through the particular region is subjected to diffraction.

As shown in FIGS. 7(a) to 7(f), an attempt to generate the same potential difference between the transparent electrode 100 and the transparent opposed electrode 32 in the first region 101 to the third region 103 would undesirably produce the situation in which a different diffraction grating is generated in each region. Specifically, even in the case where the same diffraction pattern as the pattern of the diffraction grating physically formed with grooves, it is difficult to secure the diffraction light like the diffraction grating.

FIG. 8 is a diagram showing an example of the potential difference applied along one direction of the liquid crystal layer of the liquid crystal optical element and the phase amount corresponding to the potential difference.

Figure 8A:
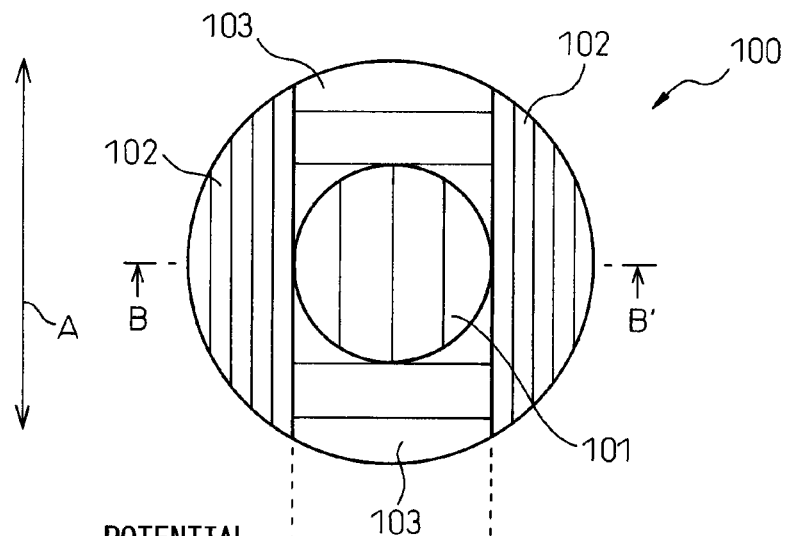
FIG. 8(a) shows the transparent electrode 100 explained with reference to FIG. 6, FIG. 8(b) a potential difference generated between the transparent opposed electrode 32 and the diffraction pattern of each region in the section taken along B-B' in FIG. 8(a), and FIG. 8(c) the phase amount in each region generated in the section taken along line B-B' in FIG. 8(a)
Figure 8B:
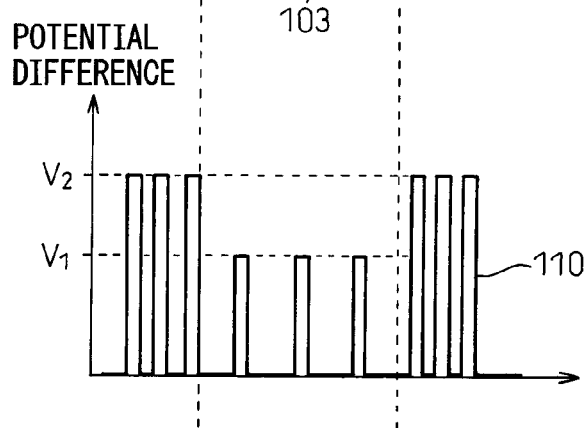
Figure 8C:
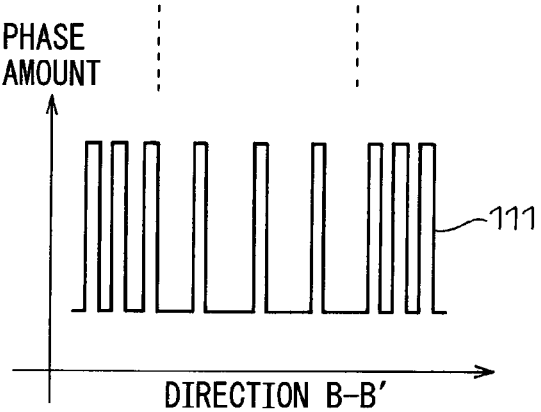

FIG. 8(a) shows the transparent electrode 100 explained with reference to FIG. 6, FIG. 8(b) shows the potential difference generated between the diffraction pattern and the transparent opposed electrode 32 in each region (the first region 101 and the second region 102) in the section taken along line B-B' in FIG. 8(a), and FIG. 8(c) shows the phase amount in each region generated in the section taken along line B-B' of FIG. 8(a).

As shown in FIGS. 7(b) and 7(d), an attempt to produce the same potential difference between the transparent electrode 100 and the transparent opposed electrode 32 in the first region 101 and the second region 102 having different pitches would result in a different phase difference distribution generated in each of the regions. In view of this, in the liquid crystal panel 30, as shown in FIG. 8(b), the potential difference v1 in the first region 101 and the potential difference v2 in the second region 102 are adjusted (see the voltage distribution 110) (specifically, v1 and v2 are set to hold the relation v1<v2). In this way, the liquid crystal panel 30, as shown in FIG. 8(c), is controlled in such a manner that the maximum and minimum values of the phase difference distribution generated in the first region 101 are identical with the maximum and minimum values, respectively, of the phase difference distribution generated in the second region 102 (see the phase difference distribution 111).

As shown in FIG. 8(b), the potential difference v1 in the first region 101 and the potential difference v2 in the second region 102 are set, and therefore, as shown in FIG. 8(c), the liquid crystal panel 30 can be rendered to function as a diffraction grating having the grooves of the same depth in the first region 101 and the second region 102.

FIG. 9 is a diagram showing an example of the potential difference applied along another direction of the liquid crystal layer of the liquid crystal optical element and the phase amount corresponding to the potential difference.

Figure 9A:
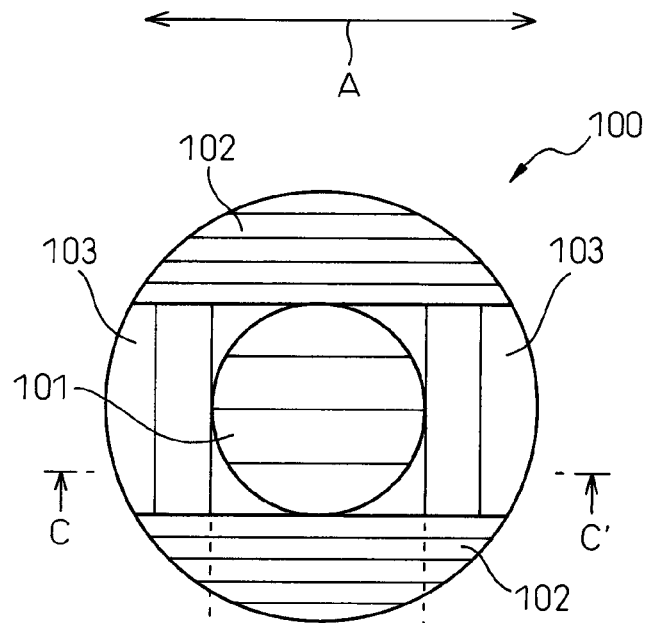
FIG. 9(a) shows the transparent electrode 100 explained with reference to FIG. 6, FIG. 9(b) a potential difference generated between the transparent opposed electrode 32 and the diffraction pattern of each region in the section taken along line C-C' in FIG. 9(a), and FIG. 9(c) the phase amount in each region generated in the section taken along line C-C' in FIG. 9(a)

FIG. 9(a) shows the transparent electrode 100 explained with reference to FIG. 6, FIG. 9(b) the potential difference generated between the diffraction pattern of each region (the first region 101 and the third region 103) in the section taken along line C-C' in FIG. 9(a) and the transparent opposed electrode 32, and FIG. 9(c) the phase amount in each region generated in the section taken along line C-C' in FIG. 9(a).

As shown in FIGS. 7(b) and 7(f), an attempt to generate the same potential difference between the transparent electrode 100 and the transparent opposed electrode 32 in the first region 101 and the third region 103 having different directions of diffraction with respect to the orientation direction A would result in a different phase difference distribution in each region. In the liquid crystal panel 30, therefore, as shown in FIG. 9(c), the potential difference v1 in the first region 101 and the potential difference v3 in the third region are adjusted as shown in FIG. 9(b) so that the maximum value and the minimum value of the phase difference distribution generated in the first region 101 are equal to the maximum value and the minimum value, respectively, of the phase difference distribution (see the phase difference distribution 121) generated in the third region 103 (see the voltage distribution 120). Specifically, the relation is set to hold v1<v3.

Figure 9B:
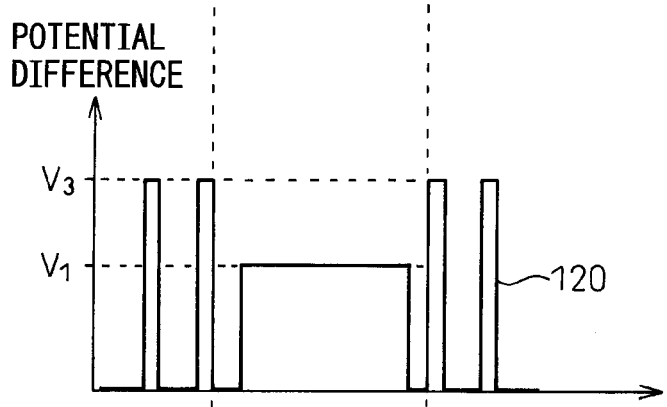
Figure 9C:
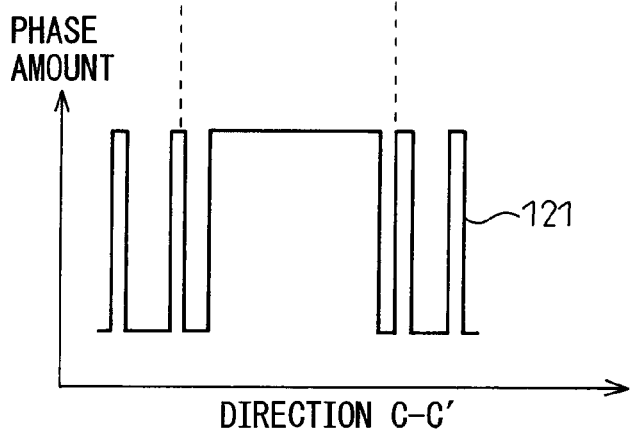
Figure 10A:
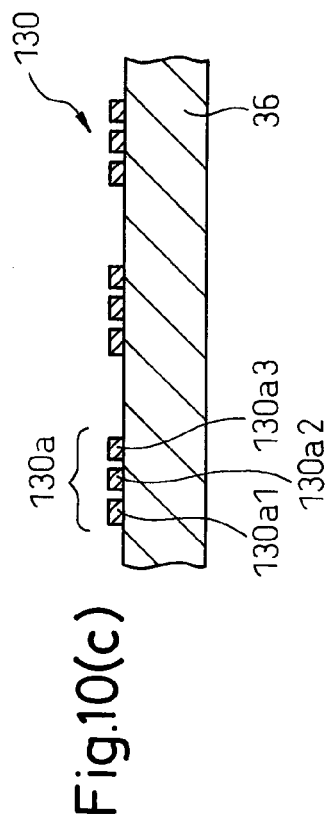
FIG. 10(a) shows an example of the band-shaped pattern 100a in the first region 101 of the transparent electrode 100, FIG. 10(b) a phase different distribution 140 in the first region 101 of the transparent electrode 100, FIG. 10(c) an example of the transparent electrode 130 for the blazed (saw-toothed) diffraction, and FIG. 10(d) an example of the phase difference distribution 140' generated by the transparent electrode in FIG. 10(c)
Figure 10C:
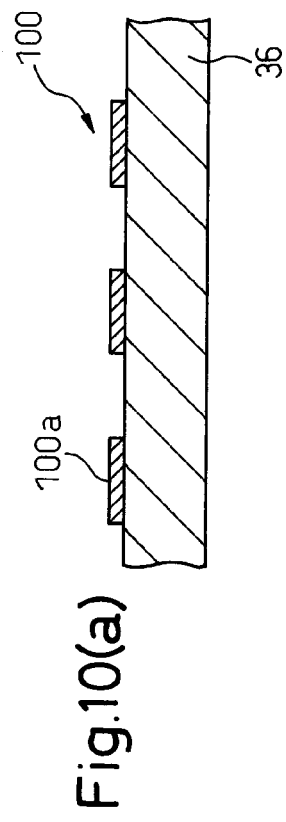
Figure 10B:
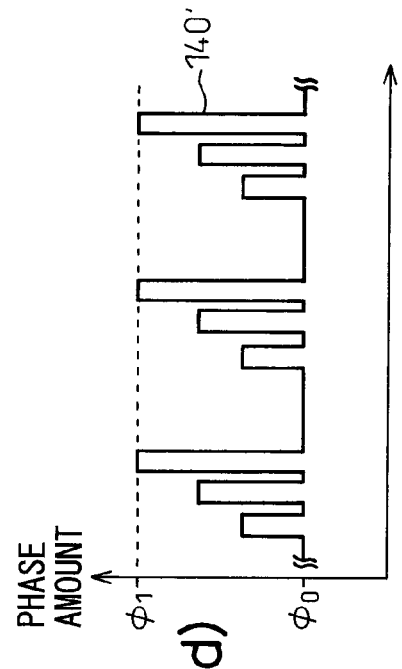
Figure 10D:
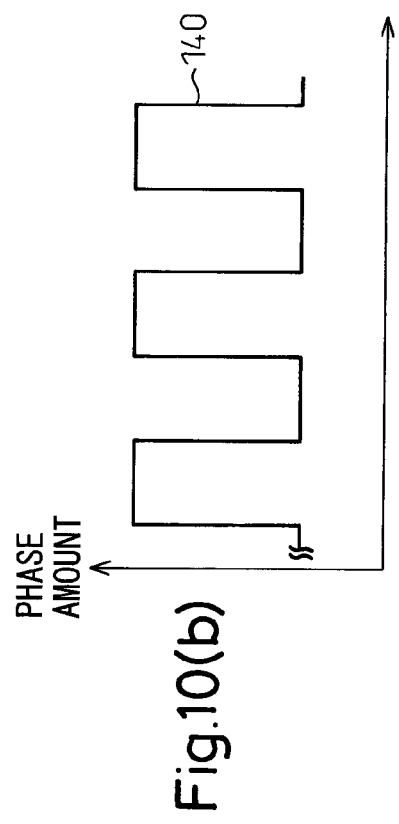

As shown in FIG. 9(b), the potential difference v1 in the first region 101 and the potential difference v3 in the third region are set, and therefore, as shown in FIG. 9(c), the liquid crystal panel 30 can be caused to function as a diffraction grating having the same groove depth in the first region 101 and the second region 103.

In the liquid crystal panel 30, as shown in FIGS. 8(b) and 9(b), the potential difference in each region is adjusted in the liquid crystal driving unit 40. In the first region 101, the second region 102 and the third region 103, therefore, the liquid crystal panel 30 can be caused to function as a diffraction grating having the same groove depth. Specifically, the configuration described above makes it possible to control the liquid crystal panel 30 in such a manner as to produce the same diffraction light as in the diffraction grating physically formed with the grooves.

Incidentally, the number and the width of the band-shaped patterns in the diffraction pattern of the transparent electrode in FIGS. 8 and 9 are only an example, and it should be noted that the invention is not limited to this configuration. Also, the potential difference shown in FIGS. 8(b) and 9(b) is generated by the voltage applied to the transparent electrode 100 and the transparent opposed electrode 32 from the liquid crystal driving unit 40.

As explained above, in the case where the blue laser light is used in the optical pickup apparatus 10 shown in FIG. 1, the potential difference in each region is adjusted by the liquid crystal driving unit 40 as shown in FIGS. 8(b) and 9(b) and therefore, the liquid crystal panel 40 functions as a diffraction element. Thus, as shown in FIG. 2, the zero-order diffraction light and the three primary diffraction light can be diffracted to the photodetector 50.

In the case where the red laser is used, on the other hand, the liquid crystal driving unit 40 controls the potential difference between the transparent electrode 100 and the transparent opposed electrode 32 to assume zero not to generate any phase amount in any of the regions of the transparent electrode 100. In the case where a CD or DVD is used, therefore, the three light beams split by the diffraction element 23 are passed as they are through the liquid crystal panel 30 and radiated on the photodetector 50 as shown in FIG. 3.

By switching the control method of the liquid crystal driving unit 40 using the control signal from the control unit 71, therefore, the liquid crystal panel 30 can be used as a diffraction element in the case where the high-density optical recording medium 60 is used on the one hand and as an element (nondiffraction element) for passing the beam as it is in the case where CD or DVD is used on the other hand. Also, this configuration, in keeping with the operation requirement of the high-density optical recording medium 60 and CD or DVD using the liquid crystal panel 30 as described above, makes it possible to reduce both the cost and size of the optical pickup apparatus 10.

In the example described above, the liquid crystal panel 30 is rendered to function as a diffraction element for diffracting the primary diffraction light at an appropriate position in the case where the blue laser light is used. Nevertheless, the liquid crystal panel 30 can be caused to function also as a diffraction element for the laser light of other wavelength. In such a case, the diffraction change with wavelength can be adjusted by controlling the phase difference distribution. In other words, the potential difference generated between the transparent electrode 100 an the transparent opposed electrode 32 is adjusted to form the phase difference distribution suited to the light beam of the wavelength used.

FIG. 10 is a diagram for explaining the blazed diffraction.

FIG. 10(*a*) shows an example of the band-shaped pattern 100*a* in the first region 101 of the transparent electrode 100 described above, and FIG. 10(*b*) the phase difference distribution 140 in the first region 101 of the transparent electrode 100. Specifically, in the transparent electrode 100 of the liquid crystal panel 30 described above, the phase difference distribution for the binary diffraction with the band-shaped pattern 100*a* is formed.

FIG. 10(*c*) shows an example of the transparent electrode 130 for blazed (saw-toothed) diffraction. As shown in FIG. 10(*a*), although each band-shaped pattern 100*a* of the transparent electrode 100 is rectangular, each band-shaped pattern 130*a* of the transparent electrode 130 for blazed (sawtoothed) diffraction is subdivided into three parts 130*a*1, 130*a*2 and 130*a*3.

By generating a stepped potential difference between the three parts of each band-shaped pattern 130*a* shown in FIG. 10(*c*) and the transparent opposed electrode 32, the blazed (saw-toothed) phase difference distribution 140' can be generated as shown in FIG. 10(*d*).

In the case where the liquid crystal panel 30 is caused to function as a diffraction grating having the blazed (sawtoothed) phase difference distribution 140', the situation can be produced in which the zero-order diffraction light is not generated in the case where the difference between the maximum phase amount Ψ1 and the minimum phase amount Ψ0 is one half of the wavelength λ of the light beam used. Further, the light amount of the zero-order diffraction light can be adjusted by adjusting the difference between the maximum phase amount Ψ1 and the minimum phase amount Ψ0.

Each band-shaped pattern 130*a* is subdivided into three parts in FIG. 10(*c*). However, this is only an example and each band-shaped pattern can be subdivided into more parts. By thus subdividing the band-shaped pattern into many parts (eight parts, for example), a more accurate blazed (sawtoothed) phase difference distribution 140' can be formed, thereby making it possible to realize the situation in which the zero-order diffraction light is not generated at all or in which the light amount of the zero-order diffraction light can be adjusted more accurately.

Figure 11A:
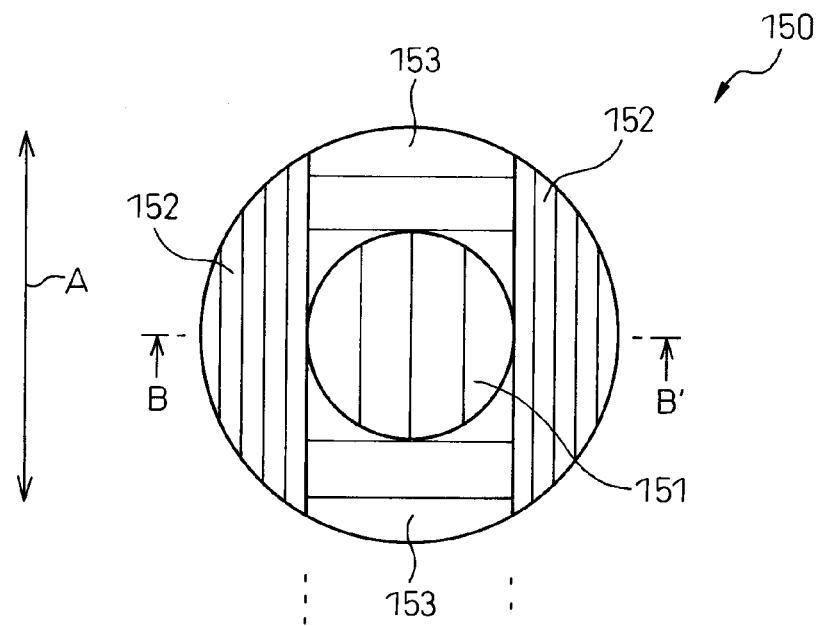
FIG. 11(a) shows the transparent electrode 150 for generating the blazed (saw-toothed) phase difference distribution, and FIG. 11(b) the phase difference distribution in each region generated in the section taken along line B-B' in FIG. 11(a)
Figure 11B:
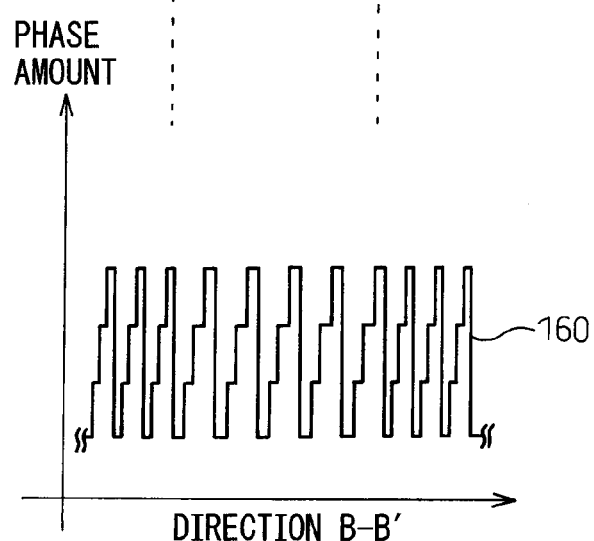

FIG. 11 is a diagram showing an example of the transparent electrode 150 for generating the blazed (saw-toothed) phase difference distribution and a corresponding phase difference distribution.

The transparent electrode 150 shown in FIG. 11(*a*), like the transparent electrode 100 shown in FIG. 6, has a first region 151, a second region 152 and a third region 153, and the band-shaped pattern included in the diffraction pattern in each region is subdivided into three parts as shown in FIG. 10(*c*). Incidentally, the orientation direction of the liquid crystal and the direction and the pitch of the band-shaped pattern in the first region 151, the second region 152 and the third region 153 are similar to those of the transparent electrode 100 shown in FIG. 6. The transparent electrode 150 can be used in place of the transparent electrode 100 in the liquid crystal panel 30.

FIG. 11(*b*) shows the phase difference distribution in each region generated in the section taken in line B-B' in FIG. 11(*a*). Also in this case, the potential difference in each region is adjusted by the liquid crystal driving unit 40, and the blazed phase difference distribution 160 is generated in such a manner that the difference between the maximum and minimum values of the phase amount is the same in the first region 151 and the second region 152. Incidentally, though not shown, this is also the case with the first region 151 and the third region 153.

Figure 12:
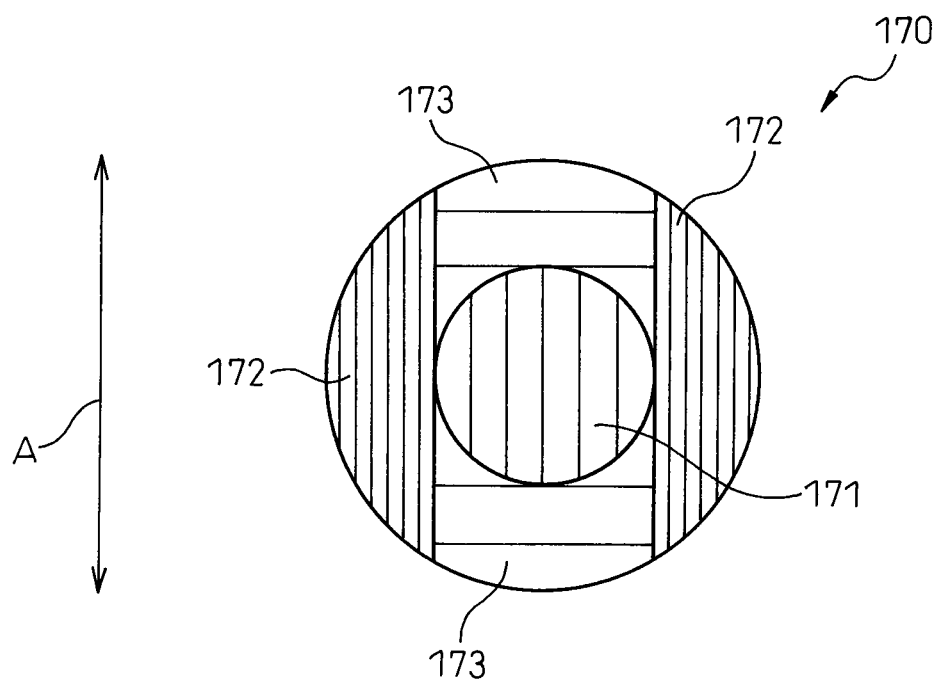
FIG. 12 is a diagram showing an example of still another transparent electrode.

FIG. 12 is a diagram showing still another example of the transparent electrode.

The transparent electrode 170 shown in FIG. 12 also has a first region 171, a second region 172 and a third region 173. The relation between the direction of the band-shaped patterns of the diffraction pattern and the orientation direction A of the liquid crystal in each region are similar to that in the transparent electrode 100 shown in FIG. 6. In the transparent electrode 170 shown in FIG. 12, however, the pitches of the band-shaped patterns are varied from one region to another. Thus, in the transparent electrode of the liquid crystal panel 30 functioning as a diffraction element, the optimum diffraction pattern can be selected appropriately in accordance with the size of the photodetector 50 and the position at which it is arranged.

The examples described above are so configured that the transparent electrode has three regions, and in the case where it is used as a diffraction element, three primary diffraction light are generated. Nevertheless, the regions of the transparent electrode may be changed to generate only one or two primary diffraction light or four or more primary diffraction light as required.

Figure 13A:
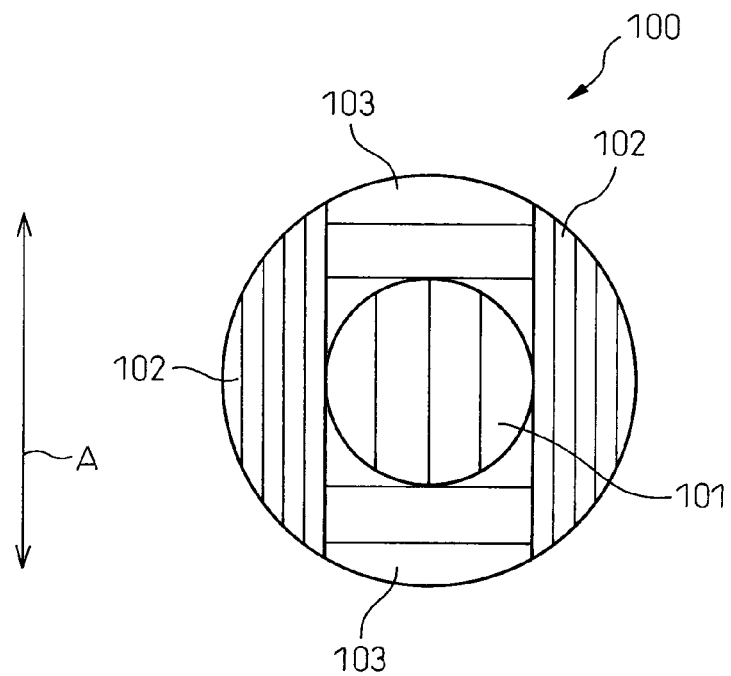
FIG. 13(a) shows the transparent electrode 100 having the diffraction pattern in the first region 101 to the third region 103 similar to FIG. 6, and FIG. 13(b) the transparent opposed electrode 180 split into three regions.

FIG. 13 is a diagram showing another pair of a transparent electrode and a transparent opposed electrode.

FIG. 13(*a*) shows the transparent electrode 100 having a diffraction pattern of first to third regions 101 to 103 similar to those of FIG. 6. FIG. 13(*b*), on the other hand, shows a transparent opposed electrode 180 divided into three regions including first to third regions 181 to 183.

In the case of FIG. 6, the transparent electrode 100 shown in FIG. 6 is divided into three regions, and as shown in FIGS. 8(*b*) and 9(*b*), the applied voltage is changed from one region to another. The transparent opposed electrode 32 in opposed relation to the transparent electrode 100 shown in FIG. 6, on the other hand, is a non-segmented solid electrode impressed with the same voltage in its entirety.

The phase difference distribution similar to the case of FIG. 6 can be generated, however, by applying the same voltage to all the diffraction patterns of the first to third regions 101 to 103 using the transparent electrode 100 as shown in FIG. 13(*a*) while changing the applied voltage from one region to another using the transparent opposed electrode 180 as shown in FIG. 13(*b*). Specifically, the voltage is applied in such a manner that the potential difference V1 is generated between the transparent electrode 100 and the first region 181 of the transparent opposed electrode 180, the potential difference V2 between the transparent electrode 100 and the second region 182 of the transparent opposed electrode 180 and the potential difference V3 between the transparent electrode 100 and the third region 183 of the transparent opposed electrode 180.

As described above, instead of dividing the diffraction pattern on the transparent electrode into a plurality of regions and adjusting the potential difference with the transparent opposed electrode for each region, the transparent opposed electrode may be divided into a plurality of regions and the potential difference with the transparent electrode for each region may be adjusted. The design freedom for connecting the wires to each electrode is advantageously increased by dividing the transparent opposed electrode having no diffraction pattern into a plurality of parts than by dividing the transparent electrode already having a diffraction pattern into a plurality of parts.

Figure 13B:
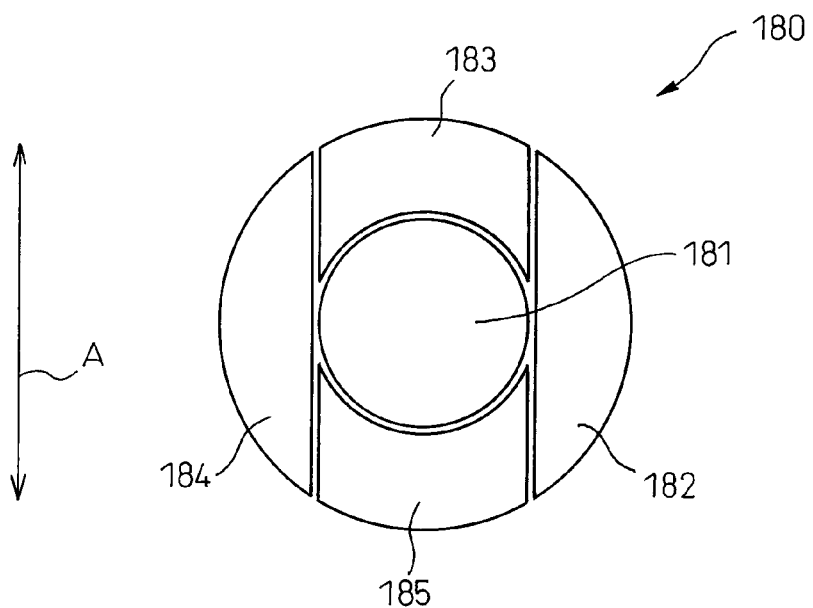

Incidentally, the method of dividing the transparent opposed electrode into a plurality of parts is not limited to the pattern shown in FIG. 13(b), but other dividing methods may alternatively be employed.

Figure 14:
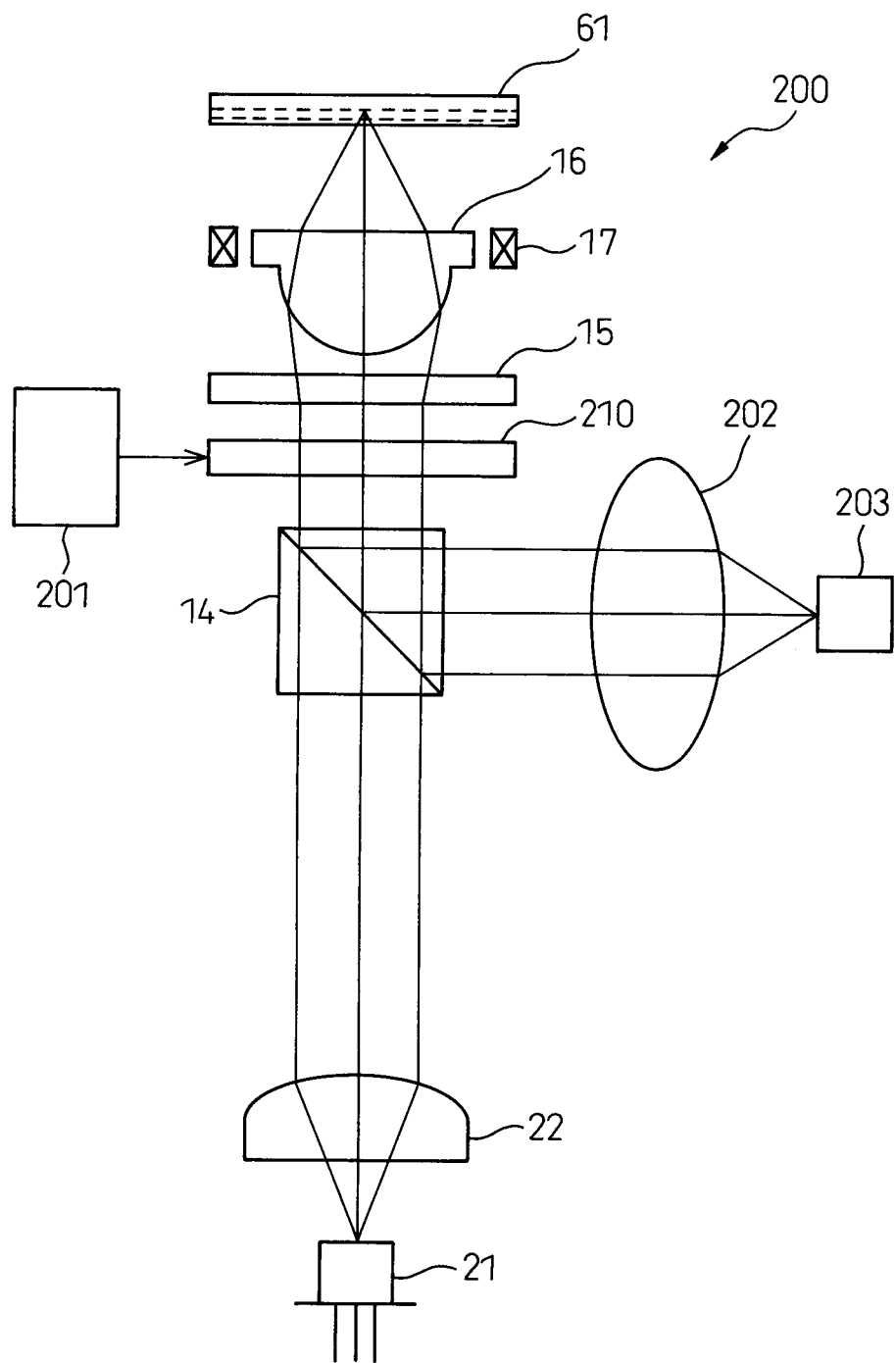
FIG. 14 is a diagram showing a general configuration of another optical pickup apparatus according to the invention.

FIG. 14 is a diagram showing a general configuration of another example of the optical pickup apparatus according to this invention.

FIG. 14 shows a case in which the play (reproduction) operation is performed from the low- or middle-density optical recording medium 61 such as a CD or DVD. In this case, the optical pickup apparatus 200 so operates that the light beam having the wavelength of 660 nm emitted from the light source 21 constituting a semiconductor laser is converted into a substantially parallel light of effective light fluxes 5 by the collimate lens 22 and enters the liquid crystal panel 210 through the polarization light beam splitter 14.

The liquid crystal panel 210 includes a transparent electrode having a diffraction pattern set in such a manner that the width of at least one band-shaped pattern electrode is set to secure a constant diffraction efficiency in all the regions with the light beam subjected to the phase modulation and a transparent opposed electrode arranged in opposed relation to the transparent electrode. The liquid crystal panel 210, in which a predetermined potential difference is generated between the transparent electrode and the transparent opposed electrode by the liquid crystal driving unit 201 thereby to generate a phase amount distribution having the phase difference of about $\lambda/2$ and perform the switching control operation to function as a diffraction element for emitting substantially all the incident light beams as the primary diffraction light.

The diffraction light beam emitted from the liquid crystal panel 210 enters the $\lambda/4$ plate 15. The diffraction light beam (outgoing light) converted into the circularly polarized light from the linearly polarized light in the $\lambda/4$ plate 15 is converged on the CD or the DVD 61 (DVD in the case under consideration) by the objective lens 16. In the process, the objective lens 16 converges the diffraction light in a way suitable for the DVD 61 having the substrate thickness of 0.6 mm. In other words, the liquid crystal panel 210 functions as a liquid crystal lens capable of changing the focal point of the objective lens substantially.

The light reflected from the CD or DVD 61 is passed again through the objective lens 16 and, through the $\lambda/4$ plate 15, converted from the circularly polarized light into the linearly polarized light with the direction of polarization orthogonal to the outgoing light. The light beam emitted from the $\lambda/4$ plate 15 is changed in the light path in the polarized light beam splitter 14 and converged on the photodetector 203 by the convergence lens 202.

The photodetector 203, based on the received light, outputs the FE (focus error) signal, the TE (tracking error) signal and the RF signal. In a control mechanism not shown, the drive mechanism 17 is controlled using the FE signal and the TE signal output from the photodetector 203 to perform the focusing and tracking operation of the objective lens 16 thereby to control the convergence spot in such a manner that a predetermined position on the CD or DVD may be kept tracked by the convergence spot due to the objective lens 16. Also, in the control mechanism not shown, the information recorded in the CD or DVD 61 is reproduced based on the RF signal output from the photodetector 203.

Incidentally, in writing the information in the CD or DVD 61, the light beam emission from the light source 21 is modulated in accordance with the recorded information, and while performing the tracking or focusing operation on the objective lens 16 using the FE signal and the TE signal output from the photodetector 203, the coloring matter or the like of the writable CD or DVD 61 is decomposed, modified or altered by the thermal effect of the light beam thereby to write the information.

In the case where the information is reproduced from the high-density optical recording medium (not shown) such as a Blu-ray disc or the like in the optical pickup apparatus 200 shown in FIG. 14, the light beam having the wavelength of 405 nm emitted from another semiconductor laser light source is converted into a substantially parallel light by a collimate lens and, through the polarized light beam splitter 14, is led to enter the liquid crystal panel 210.

The liquid crystal panel 210 is switched by the liquid crystal driving unit 201 in such a manner as to function as a nondiffraction element. The light beam that has entered the liquid crystal panel 210, therefore, is directly passed through the liquid crystal panel 210 and enters the $\lambda/4$ plate 15. The light beam (outgoing light) converted from the linearly polarized light to the circularly polarized light in the $\lambda/4$ plate 15 is converged on the high-density optical recording medium (not shown) by the objective lens 16.

The light beam reflected from the high-density optical recording medium is passed again through the objective lens 16 and, through the $\lambda/4$ plate 15, converted from the circularly polarized light into the linearly polarized light with the direction of polarization thereof orthogonal to the outgoing light. The light beam emitted from the $\lambda/4$ plate 15 is changed in the optical path by the polarized light beam splitter 14 and converged on the photodetector 203 by the objective lens 202.

The photodetector 203, based on the received light, outputs the FE signal, the TE signal and the RF signal. In the control mechanism not shown, the driving mechanism 17 is controlled using the FE and TE signals output from the photodetector 203 thereby to perform the focusing and tracking operation of the objective lens 16. In this way, a predetermined position on the high-density optical recording medium is constantly tracked by the convergence spot through the objective lens 16. Also, in the control mechanism not shown, the information recorded in the high-density optical recording medium is reproduced based on the RF signal output from the photodetector 203.

In writing the information in the high-density optical recording medium, the light beam emission from another semiconductor laser light source is modulated in accordance with the recorded information, and while performing the tracking and focusing operation of the objective lens 16 using the FE and TE signals output from the photodetector 203, the coloring matter or the like of the writable high-density optical recording medium is decomposed, modified or altered by the thermal effect of the light beam thereby to write the information.

Figure 15:
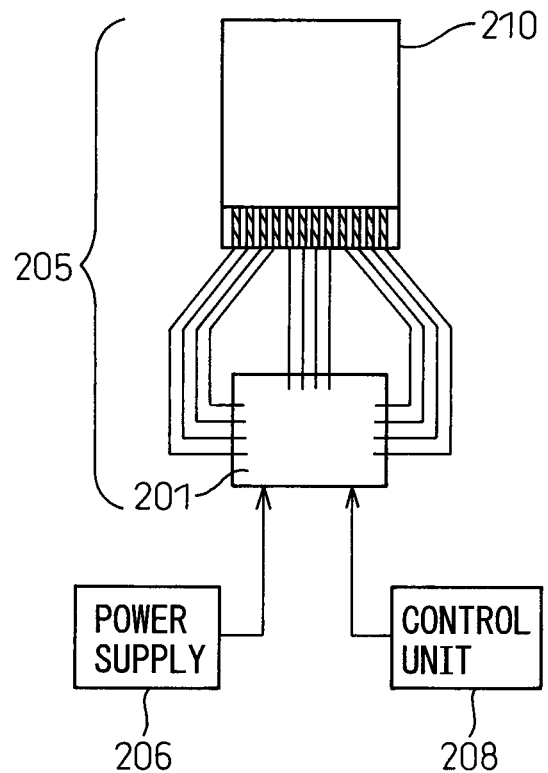
FIG. 15 is a diagram for explaining the configuration of the liquid crystal optical element and the configuration of a liquid crystal panel driving system.
Figure 16:
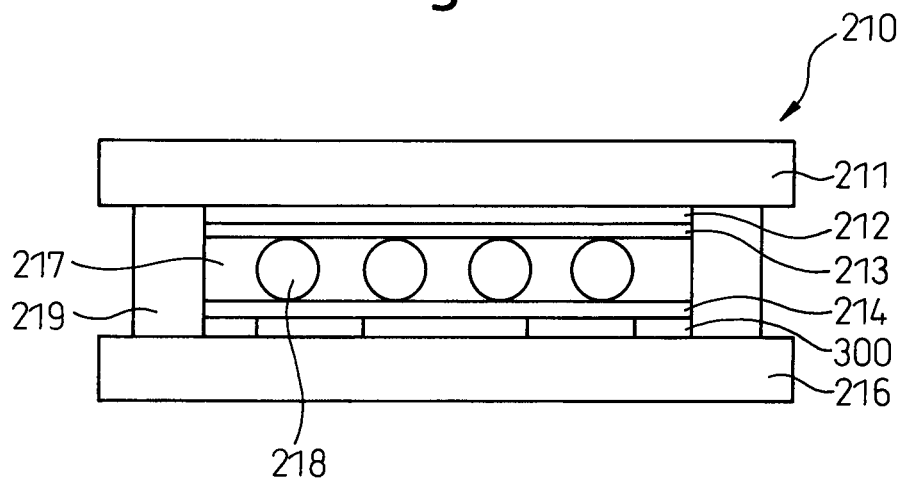
FIG. 16 is a sectional view schematically showing the liquid crystal panel.

FIG. 15 is a diagram for explaining the configuration of the liquid crystal optical element and the liquid crystal panel driving system. FIG. 16 is a sectional view schematically showing the liquid crystal panel.

As shown in FIG. 15, the liquid crystal panel 210 is driven by a liquid crystal driving unit 201 configured of an IC or the like and connected to a control unit 208 including a power supply unit 206, CPU, ROM and RAM. The liquid crystal driving unit 201, based on the control signal from the control unit 208, performs the switching control operation (for the high-density light recording medium or for CD or DVD) corresponding to the optical recording medium of the liquid crystal panel 210 on the one hand and the on/off control operation at the same time. Incidentally, in this specification, the liquid crystal panel 210 combined with the liquid crystal driving unit 201 is referred to as the liquid crystal optical element 205.

As shown in FIG. 16, the liquid crystal panel 210 includes a transparent substrate 211, a transparent substrate 216, a seal member 219, a plurality of spacers 218 for holding the interval between the transparent substrates 211 and 216, and a liquid crystal layer 217 sealed between the transparent substrates 211, 216 and the seal member 219. Also, a transparent opposed electrode (non-segmented solid electrode) 212 and an orientation film 213 are formed on the transparent substrate 21, while a transparent electrode 300 and an orientation film 214 are formed on the transparent substrate 216. It should be noted that the scale may be different from the actual one for the convenience of explanation. The liquid crystal layer 217 is formed of the nematic liquid crystal or the like processed for homogeneous orientation or homeotropic orientation.

The transparent substrates 211, 216 are flexible and formed of polycarbonate resin having the thickness of 100 μm. Nevertheless, the transparent substrates 211, 216 may alternatively be formed of a transparent glass substrate, modified acryl resin, polymethacryl resin, polyethersulfone resin, polyethylene telephthalate resin or norbornane resin. Also, the thickness of the transparent substrates 211, 216 may be set between 50 μm and 500 μm.

The transparent opposed electrode 212 and the transparent electrode 300 are formed by depositing a transparent conductive film of ITO having the thickness of about 0.03 μm by sputtering on the transparent substrates 211, 216 and etching off the unrequited portions.

FIG. 17 is a diagram showing an example of the transparent opposed electrode 212 and the transparent electrode 300 and the phase amount distribution within the effective light fluxes 5. FIG. 17(a) is a diagram showing a pattern of the transparent opposed electrode 212, and FIG. 17(b) a diagram showing an example of the diffraction pattern formed on the transparent electrode 300. FIG. 17(c) shows the phase difference distribution in the direction OA of the electrode pattern shown in FIG. 17(a), and FIG. 17(d) the phase difference distribution in the direction OB of the electrode pattern in FIG. 17(a).

Figure 17A:
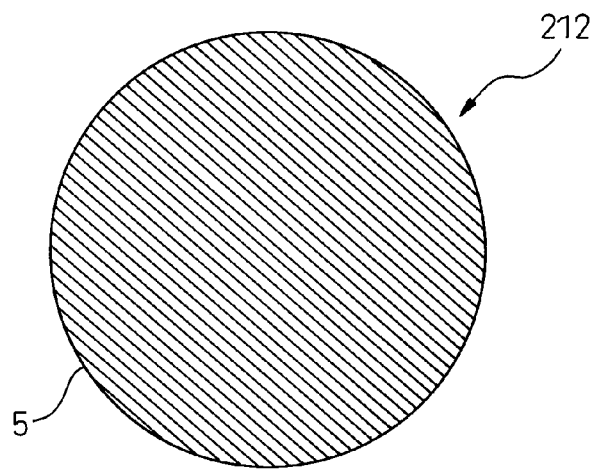
FIG. 17(a) is a diagram showing the pattern of the transparent opposed electrode 21, FIG. 17(b) an example of the diffraction pattern formed in the transparent electrode 300, FIG. 17(c) a phase difference distribution in the direction OA of the electrode pattern shown in FIG. 17(a), and FIG. 17(d) the phase difference distribution in the direction OB of the electrode pattern shown in FIG. 17(a)

As shown in FIG. 17(a), the transparent opposed electrode 212 of the liquid crystal panel 210 forms a non-segmented solid pattern. Incidentally, the arrow C in FIG. 17(b) indicates the direction of orientation of the liquid crystal layer (FIG. 16).

Figure 17B:
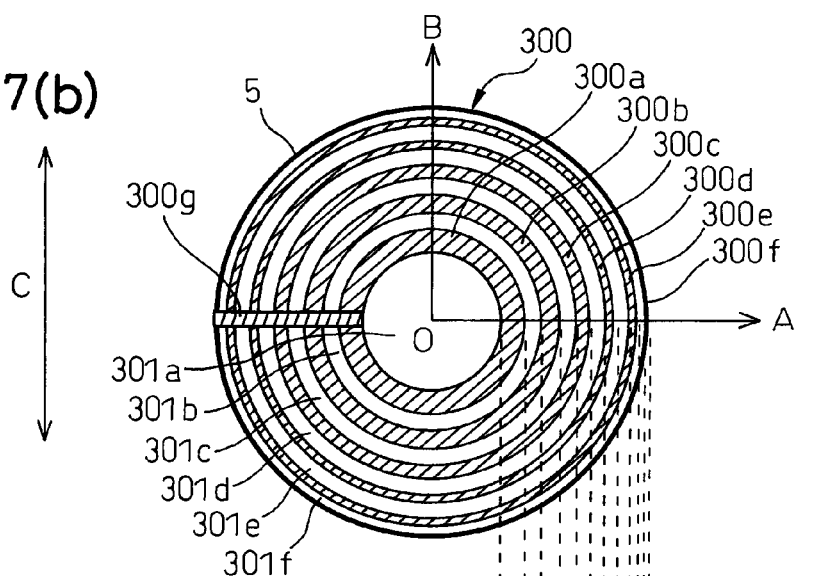

As shown in FIG. 17(b), the diffraction pattern in the transparent electrode 300 has a plurality of band-shaped pattern electrodes 300a to 300f arranged concentrically, and connected in bundles by a leading electrode 300g. Also, gap regions 301a to 301f are formed between the band-shaped pattern electrodes 300a to 300f. Incidentally, as described later, the width of the band-shaped pattern electrodes 300a to 300f and the gap width are adjusted to an amount larger toward the peripheral part with respect to the value estimated according to the equation described below. A specific method of setting the electrode width and the gap width is described later.

Figure 17C:
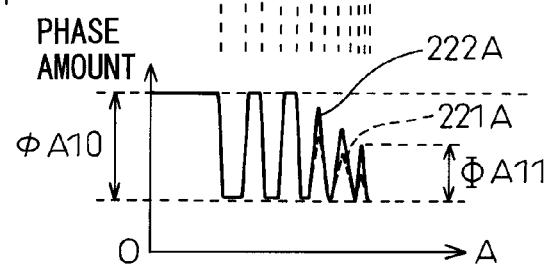
Figure 17D:
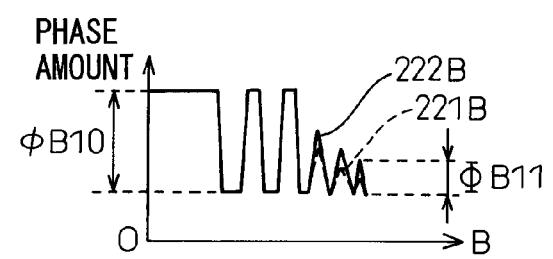

In the liquid crystal panel 210 having the pattern shown in FIGS. 17(a) and 17(b), upon application of a uniform electric field to the liquid crystal layer of the liquid crystal panel, as shown in FIGS. 17(c) and 17(d), (though different values are assumed between the phase difference (φA10, φB10) in the central part of the diffraction pattern and the phase difference (φA11, φB11) in the peripheral part), a phase distribution (222A, 222B) can be obtained in which the phase difference between the region of the band-shaped pattern electrodes and the gap region is larger than the phase amount distribution (221A, 221B) in the unadjusted liquid crystal panel indicated by the dashed line in the drawing. This is by reason of the fact that the width of the band-shaped pattern electrodes and the gap width of the transparent electrode 300 are adjusted in such a manner that the diffraction efficiency acting on the light beam entering the liquid crystal panel is kept constant in all the phase modulating regions in the liquid crystal layer by applying a voltage to the liquid crystal layer held between the transparent electrode 300 and the transparent opposed electrode 212. In this case, the phase difference holds the relation φA11>φB11.

Incidentally, the diffraction pattern shown in FIG. 17(b) is only an example, and the optimum number of the band-shaped pattern electrodes, electrode width and interval can selected in accordance with the system to secure the desired value of the radius of curvature of the spherical component of the corrugated surface shape of the passing light beam. Also, the band-shaped pattern electrodes and the gap regions may be replaced with each other.

Next, a specific method of setting the electrode pattern is explained in detail.

With regard to the wavelength λ of the light beam used, the phase difference of λ/2 is generated to function as a diffraction element. For this purpose, the pitch of the band-shaped pattern electrodes is determined based on Equation (6) below.

$$r_m = (2 \times m \times f \times \lambda)^{1/2} \quad (6)$$

where λ is the wavelength of the light beam, f the focal length, m the number of the band-shaped pattern electrodes as counted from the center, and $r_m$ the pitch of the mth band-shaped pattern electrode.

Next, based on the pitch of the band-shaped pattern electrodes thus obtained, the width of each of the band-shaped pattern electrodes 300a to 300f and the gap width, i.e. the interval between the electrodes are determined.

In the case where the pattern is set according to electrode width and the gap width thus determined, as explained above with reference to FIG. 28, the desired phase amount distribution cannot be obtained especially on the outer peripheral part of the diffraction pattern, resulting in the failure of diffraction of a part of the light beam. In the liquid crystal panel 210, therefore, an adjustment method is employed in which the region associated with the phase amount distribution is divided into a plurality of annular parts, for each of which the width of the band-shaped pattern electrodes and the gap width is determined by Equation (6).

Figure 18:
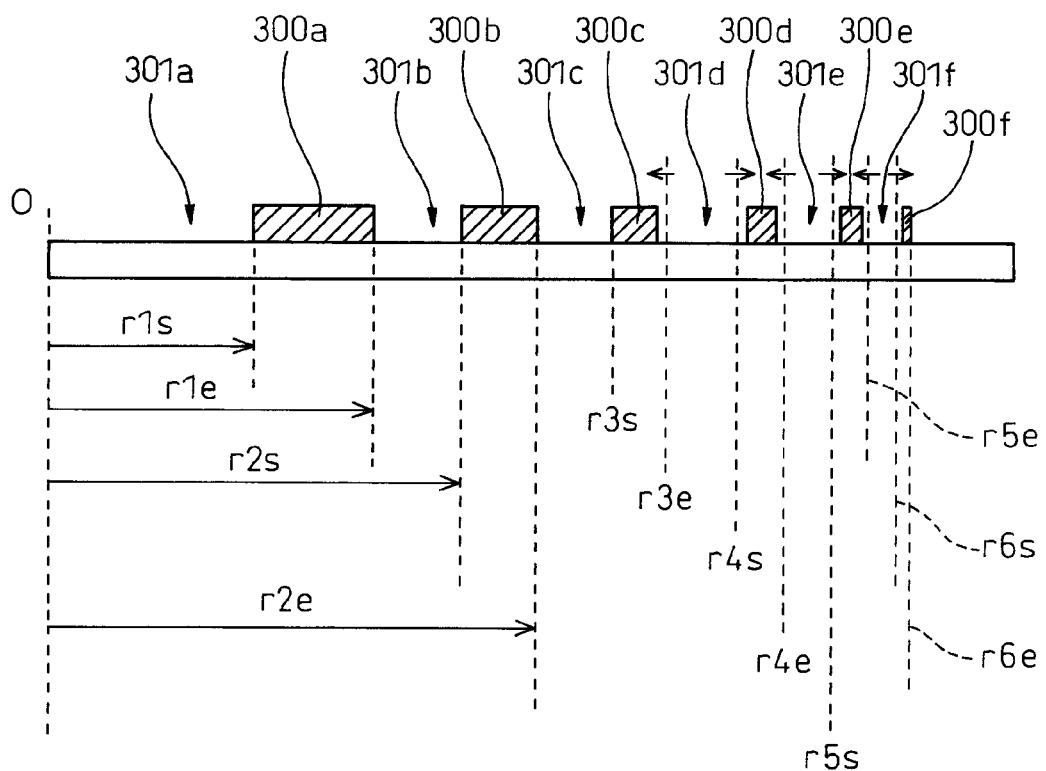
FIG. 18 is a diagram for explaining the configuration of the diffraction pattern of the transparent electrode.

FIG. 18 is a diagram showing a method of setting the diffraction pattern formed on the transparent electrode 300 shown in FIG. 17(b).

Figure 26:
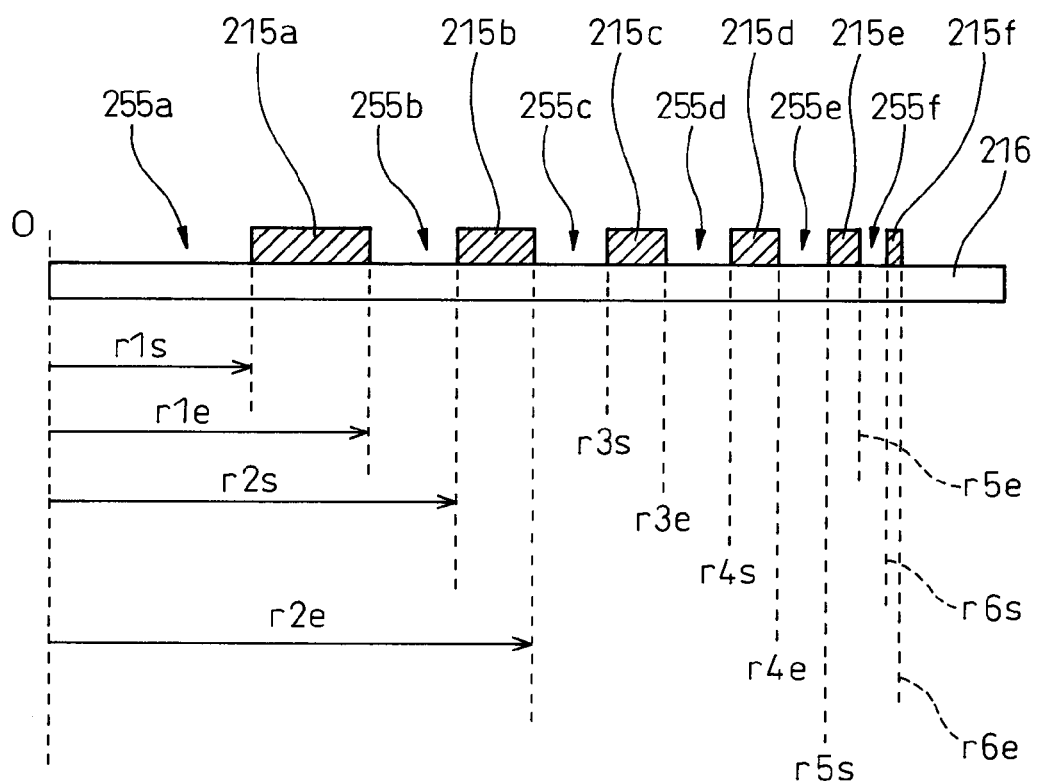
FIG. 26 is a diagram for explaining the configuration of the transparent electrode in the liquid crystal panel 400.

In FIG. 18, reference characters $r_{me}$ and $r_{ms}$, like those in FIG. 26, designate the radii of the band-shaped pattern electrode and the gap region, respectively, determined from Equations (2) and (3), and therefore, are not explained in detail here.

Figure 28A:
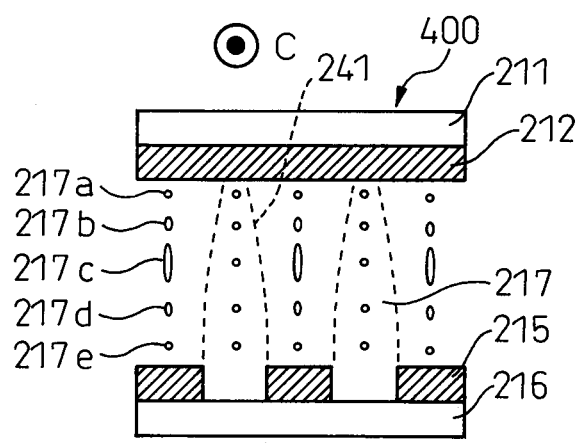
FIG. 28(a) is a diagram for explaining the behavior of the liquid crystal molecules in the section of the central part of a plurality of band-shaped pattern electrodes arranged concentrically in the direction OA, FIG. 28(b) the phase amount distribution 231 corresponding to FIG. 28(a), FIG. 28(c) a diagram for explaining the behavior of the liquid crystal molecules in the section of the peripheral part of a plurality of band-shaped pattern electrodes arranged concentrically in the direction OA, FIG. 28(d) the phase amount distribution 232 corresponding to FIG. 28(c), FIG. 28(e) the behavior of the liquid crystal molecules with the band-shaped pattern electrodes formed in the direction OB, FIG. 28(f) the phase amount distribution 233 corresponding to FIG. 28(e), FIG. 28(g) a diagram for explaining the behavior of the liquid crystal molecules in the section of the peripheral part of a plurality of the band-shaped pattern electrodes arranged concentrically in the direction OB show in FIG. 27(a), and FIG. 28(h) the phase amount distribution 234 corresponding to FIG. 28(g)
Figure 28B:
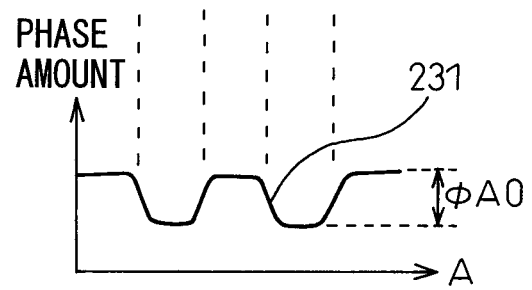
Figure 28C:
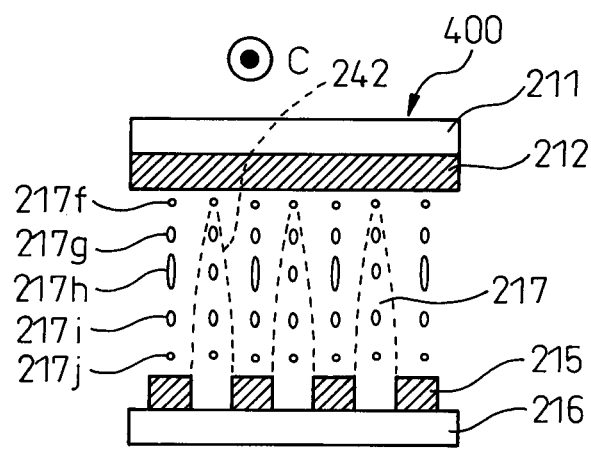
Figure 28D:
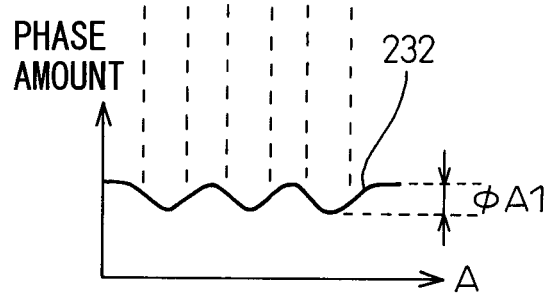
Figure 28E:
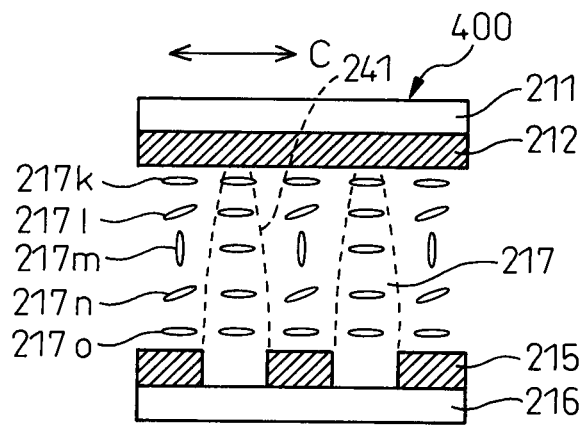
Figure 28F:
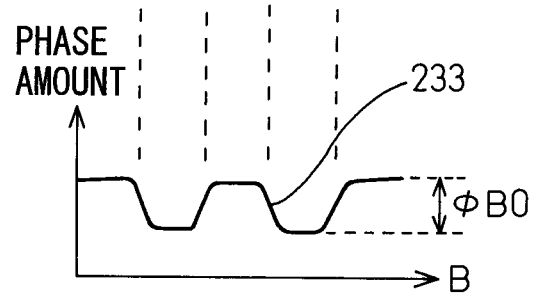
Figure 28G:
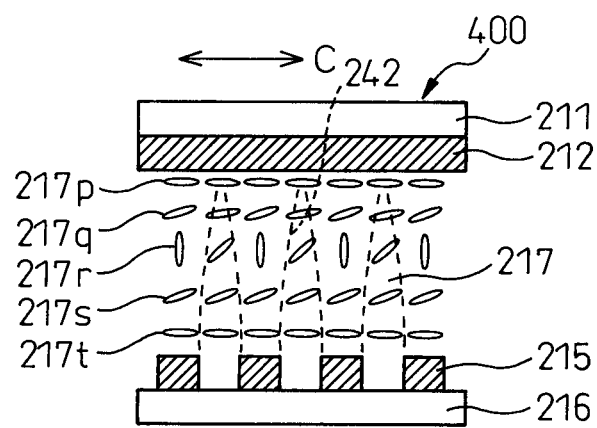
Figure 28H:
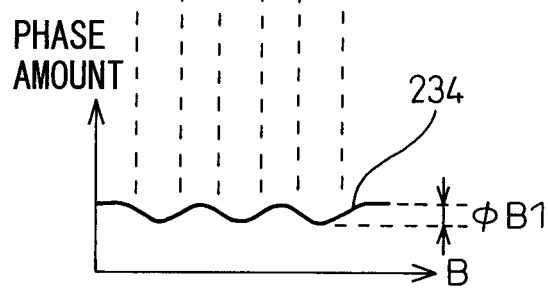

At the central part with a comparatively large gap width shown in FIG. 18, the desired phase difference of about λ/2 is obtained as shown in FIGS. 28(b) and 28(f), and therefore, the width of the band-shaped pattern electrodes 300a and 300b and the width of the gap regions 301a to 301c are set in accordance with Equations (2) and (3). In the peripheral part having a comparatively small gap width (the gap areas 301d to 301f), on the other hand, as shown in FIGS. 28(d) and 28(h), the liquid crystal molecules excessively rise to more than the predetermined position in the gap regions 301d to 301f, thereby making it difficult to obtain the desired phase difference. The excessive rise of the liquid crystal molecules in the gap regions is the caused by the field leakage from the adjoining band-shaped pattern electrodes. In view of this, the adjoining band-shaped pattern electrodes 300c to 300f are deleted to widen the gap regions 301d to 301f. Specifically, the adjoining band-shaped pattern electrodes in the peripheral part of the diffraction pattern are deleted to widen the gap regions, and thus, the excessive rise of the liquid crystal molecules to more than the predetermined position in the gap regions can be suppressed, with the result that a larger phase difference can be secured between the gap regions and the band-shaped pattern electrodes. In this way, the width of each band-shaped pattern electrode is adjusted to secure a uniform diffraction efficiency in all the regions where the light beam is phase modulated. As a result, the adjustment amount is increased progressively toward the peripheral part.

Next, the behavior of the liquid crystal molecules on the peripheral part of the diffraction pattern is explained. Especially, a detailed explanation is given about the fact that a sufficient phase difference can be secured by widening the gap regions beyond a predetermined width.

Figure 19A:
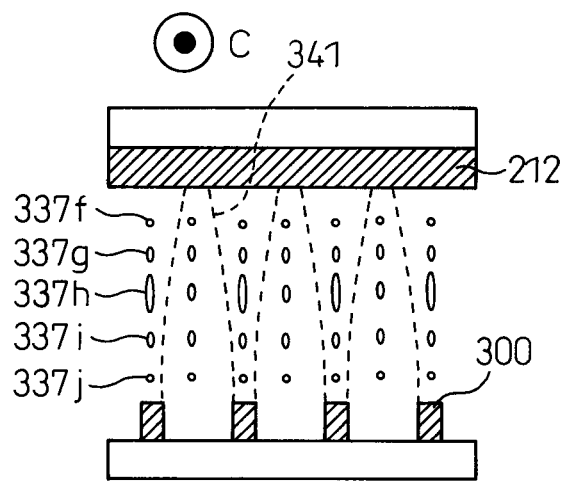
FIG. 19(a) is a diagram for explaining the behavior of the liquid crystal molecules in the section in the peripheral part of a plurality of band-shaped pattern electrodes arranged concentrically in the direction OA, FIG. 19(b) the phase amount distribution of the diffraction pattern shown in FIG. 19(a), FIG. 19(c) a diagram for explaining the behavior of the liquid crystal molecules in the section in the peripheral part of a plurality of band-shaped pattern electrodes arranged concentrically in the direction OB, and FIG. 19(d) the phase amount distribution of the diffraction pattern shown in FIG. 19(c)
Figure 19B:
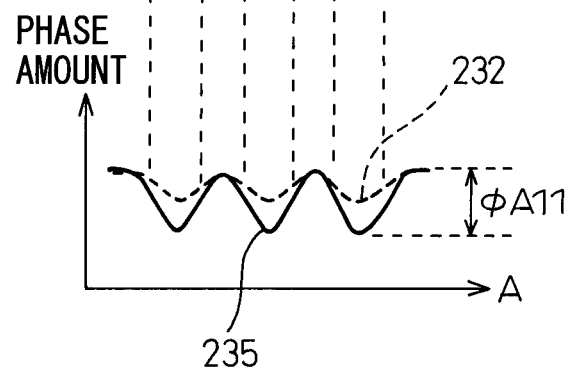

FIG. 19(a) is a diagram for explaining the behavior of the liquid crystal molecules in the section of the peripheral part of a plurality of the band-shaped pattern electrodes arranged concentrically in the direction OA in the liquid crystal panel having the transparent electrode 300 shown in FIG. 17(b). FIG. 19(b) is a diagram showing the phase amount distribution of the diffraction pattern shown in FIG. 19(a).

Actually, the band-shaped pattern electrodes are formed to a smaller width and interval progressively toward the peripheral part of the diffraction pattern. In FIG. 19, however, a plurality of the band-shaped pattern electrodes having the same width are shown to be arranged at the same intervals for the convenience of explanation. Assuming that a predetermined potential difference is generated between the transparent electrode 300 and the transparent opposed electrode 212, the liquid crystal molecules in the shape of long pins such as those designated by numerals 337f, 337g, 337h, 337i and 337j arranged along the orientation direction C behave to rise gradually as shown in FIG. 19(a). The field leakage 341 occurring in the gap regions help raise the liquid crystal molecules existing in the gap regions even more, resulting in a smaller phase difference between the band-shaped pattern electrodes and the gap regions. In the case where the gap width determined by the pattern design is small, therefore, the band-shaped pattern electrodes are reduced to widen the gap width. In this way, the excessive rise of the liquid crystal molecules which otherwise might be caused by the field leakage 341 between the adjoining band-shaped pattern electrodes can be prevented, and even on the outer peripheral part of the diffraction pattern, the desired phase difference amount can be obtained.

In the process, as shown in FIG. 19(b), the phase difference in the phase amount distribution 235 is given as φA11. This region, in which the pattern pitch is small, would be easily affected by the field leakage 341. Since the gap width between the band-shaped pattern electrodes is widened in advance, however, as shown, the field leakage 341 from the adjoining band-shaped pattern electrodes has a lesser effect. Thus, the excessive rise of the liquid crystal molecules is suppressed, and the phase difference φA11 closer to λ/2 than in the prior art can be achieved in this region. In this way, as compared with the phase amount distribution 232 indicated by dashed lines in FIG. 28(d), the phase amount distribution 235 is apparently improved.

Figure 19C:
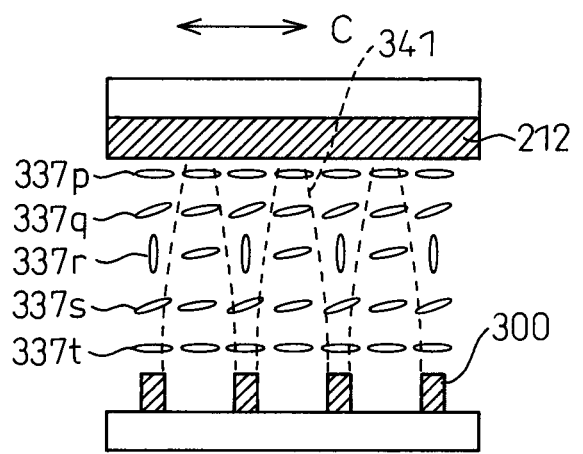
Figure 19D:
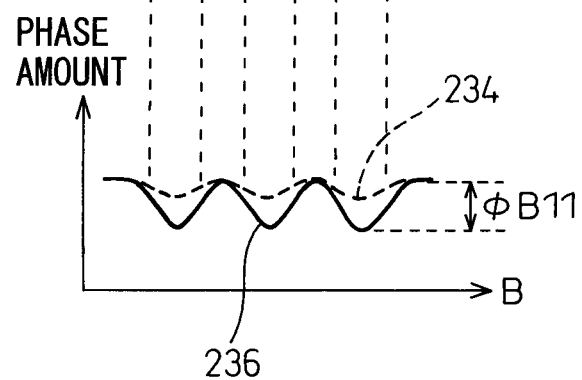

FIG. 19(c) is a diagram for explaining the behavior of the liquid crystal molecules in the section of the peripheral part of a plurality of the band-shaped pattern electrodes arranged concentrically in the direction OB in the liquid crystal panel 210 having the transparent electrode 300 shown in FIG. 17(b). FIG. 19(d) is a diagram showing the phase amount distribution of the diffraction pattern shown in FIG. 19(c).

Assuming that a predetermined potential difference is generated between the transparent electrode 300 and the transparent opposed electrode 212, the liquid crystal molecules in the shape of long pins, such as those designated by reference numerals 337p, 337q, 337r, 337s and 337t shown in FIG. 19(c), arranged along the orientation direction C begin to rise gradually. In this region, the orientation direction C of the liquid crystal molecules and the direction in which the band-shaped pattern electrodes are arranged orthogonal to each other. Therefore, the liquid crystal molecules are liable to be affected by the adjoining liquid crystal molecules as well as the field leakage 341 shown in FIG. 17(a). The liquid crystal molecules in the gap regions, therefore, more easily rise than in the case shown in FIG. 19(a).

In the process, as shown in FIG. 19(d), the phase difference in the phase amount distribution 236 is φB11. In this region, the pattern pitch is small and the liquid crystal molecules are liable to be affected by the field leakage 341. Since the gap width between the band-shaped pattern electrodes is widened in advance, however, as shown in FIG. 19(d), the effect of the field leakage 341 from the adjoining band-shaped pattern electrodes is decreased. Also, the direction in which the band-shaped pattern electrodes are arranged is substantially at right angles to the arrangement of the liquid crystal molecules, and therefore, the adjoining liquid crystal molecules easily affect each other so that the liquid crystal molecules are more liable to rise than in FIG. 19(a). Thus, the relation holds φA11>φB11. It should be understood that comparison between the phase amount distribution 234 designated by dashed lines in FIG. 28(h) and the phase amount distribution 236 shows that the phase difference distribution 236 is apparently in a position more capable of approaching λ/2.

As described above, by making adjustment to widen the gap width between the band-shaped pattern electrodes, as shown in FIGS. 19(b) and 19(d), the phase amount distribution on the peripheral part of the band-shaped pattern electrodes is improved. Also, in the liquid crystal panel 210 including the transparent electrode 300 having the diffraction pattern as shown in FIG. 17(b), the adjustment is made by shortening the electrode width to secure a constant diffraction efficiency for the gap width in the outer peripheral part of the diffraction pattern in all the regions where the phase modulation is conducted. In the liquid crystal panel 210, therefore, the stepped phase modulation having a uniform phase amount distribution is made possible in the range of effective light fluxes.

FIG. 20 is a diagram showing the change amount of the diffraction efficiency for different gap widths of the diffraction grating. FIG. 20(a) is a diagram showing the change in the zero-order light efficiency at the central part of the diffraction pattern of the liquid crystal panel 210, and FIG. 20(b) a diagram showing the change in the zero-order light efficiency on the outer peripheral part of the diffraction pattern of the liquid crystal panel 400. In each of FIGS. 20(a) and 20(b), the abscissa represents the voltage applied to the liquid crystal layer of the liquid crystal panel, and the ordinate the diffraction efficiency of the zero-order light. Also, the data in each diagram is obtained in such a manner that the zero-order light efficiency is measured using the laser light having the wavelength of 670 nm in the liquid crystal panel with the liquid crystal layer having the thickness of 10 μm.

As shown in FIG. 20(a), at the central part in the direction OA shown in FIG. 17(b), the zero-order light efficiency is almost 100% at 0 to 1.5 Vrms, and almost 0% at point a of 2.3

Vrms. It is thus understood that the zero-order light has completely disappeared in the neighboring area of point a. This behavior is also the case with the conventional liquid crystal optical element.

Figure 27A:
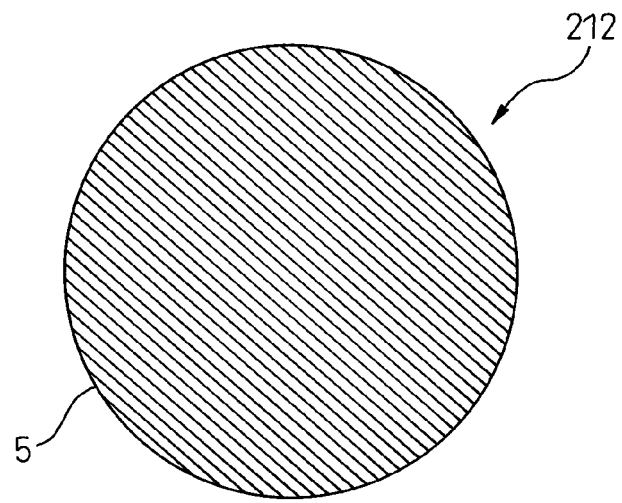
FIG. 27(a) shows an example of the transparent electrode 215 having the diffraction pattern made up of a plurality of the band-shaped pattern electrodes arranged concentrically, FIG. 27(c) the phase amount distribution generated in the direction OA in FIG. 27(b), and FIG. 27(d) the phase amount distribution generated in the direction OB in FIG. 27(b)
Figure 27B:
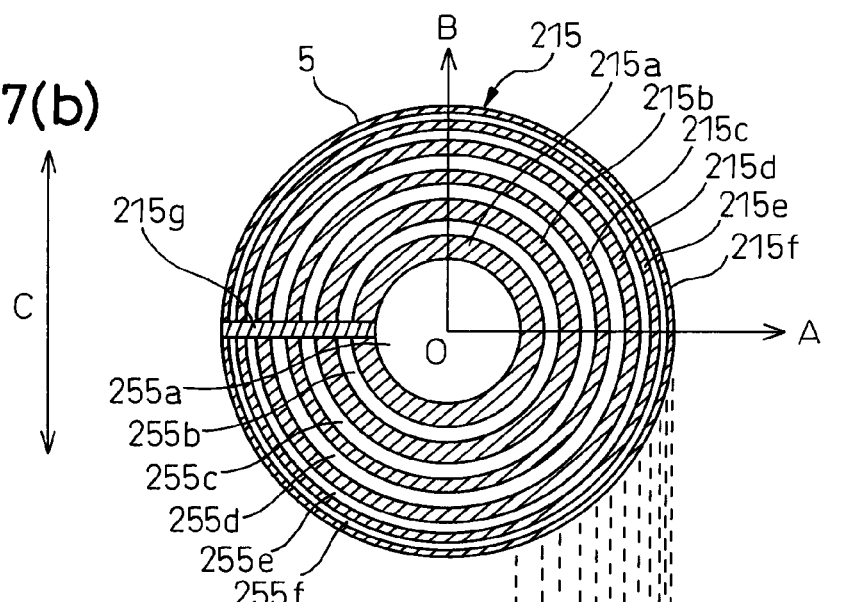

According to the data shown in FIG. 20(b) based on the profile P2 corresponding to the outer peripheral part in the direction OA shown in FIG. 27(b) (the data corresponding to FIG. 28(c) with the gap width of 10 μm for the diffraction pitch of 20 μm), the zero-order light efficiency is understood to decrease only to about 55% at point b.

In the diffraction pattern of the liquid crystal panel 210 in which the gap width is widened to 14 μm for the diffraction pitch of 20 μm, the liquid crystal exhibits the behavior shown in FIG. 19(a), and the data is represented by the profile P3 on the outer peripheral part in the direction OA shown in FIG. 17(b). As shown in FIG. 20(b), the data indicated by the profile P3 shows that the zero-order light efficiency can be reduced to about 35% at point c (about 2.3 Vrms).

As described above, the profile P3 in the diffraction pattern of the liquid crystal panel 210 apparently shows that the zero-order light efficiency is considerably reduced on the high voltage side as compared with the profile P2 of the conventional configuration. Thus, it can be understood that the gap width of the band-shaped electrodes can be adjusted in such a manner as to secure a constant diffraction efficiency in all the regions to be phase modulated without changing the diffraction pitch to determine the lens power.

The foregoing description deals with the variation of the zero-order light efficiency on the outer peripheral part in the direction OA. Though somewhat different in degree, this is also the case with outer peripheral parts in the direction OB. A further explanation is therefore omitted.

As described above, in the case where the objective lens shared for a plurality of wavelengths is used by substantively changing the focal point of the objective lens in the liquid crystal panel 210, the inconvenience that a part of the light beam passing through the diffraction pattern would fail to be diffracted properly and could not be effectively used can be prevented, thereby making it possible to effectively use the light beam.

Next, another example of the electrode pattern of the liquid crystal optical element is explained.

FIG. 21 is a diagram for explaining another example of the configuration of the transparent electrode and the transparent opposed electrode.

FIG. 21(a) is a diagram showing the pattern of the transparent opposed electrode 350 formed on the transparent substrate 211 (FIG. 16), FIG. 21(b) a diagram showing the transparent electrode 300 having the same diffraction pattern as the configuration shown in FIG. 17(b), FIG. 21(c) shows the phase amount distribution in the direction OA in FIG. 21(b), and FIG. 21(d) shows the phase amount distribution in the direction OB in FIG. 21(b). In FIG. 21, the arrow C indicates the orientation direction of the liquid crystal layer 217.

In the electrode configuration shown in FIG. 17(a), the transparent opposed electrode 212 is a non-segmented solid electrode, and therefore, the phase difference in all the regions cannot be completely equalized.

In view of this, as shown in FIG. 21(a), the transparent opposed electrode 350 is divided, by dividing lines through the center of the annular band-shaped pattern electrode, into four regions including a first region 351, a second region 352, a third region 353 and a fourth region 354. These regions are electrically isolated from each other, so that a potential difference can be applied independently between each region and the transparent electrode 300.

The first region 351 is located on the central part side of the diffraction pattern in which the orientation direction of the liquid crystal layer is substantially parallel to the band-shaped pattern electrodes 300a to 300f. The second region 352 is located on the central part side of the diffraction pattern in which the orientation direction C of the liquid crystal layer is substantially orthogonal to the band-shaped pattern electrodes 300a to 300f. The third region 353 is located on the peripheral part side of the diffraction pattern in which the orientation direction C of the liquid crystal layer is substantially parallel to the band-shaped pattern electrodes 300a to 300f. The fourth region 354 is located on the peripheral part side of the diffraction pattern in which the orientation direction C of the liquid crystal layer is substantially orthogonal to the band-shaped pattern electrodes 300a to 300f.

The first region 351, in which the pitch of the band-shaped pattern electrodes 300a to 300f in the transparent electrode 300 opposed on the central part side of the diffraction pattern is comparatively large and the band-shaped pattern electrodes are located substantially parallel to the orientation direction C of the liquid crystal layer, and therefore, corresponds to the region shown in FIG. 28(a). The second region 352, in which the pitch of the band-shaped pattern electrodes 300a to 300f opposed in the transparent electrode 300 on the central part side of the diffraction pattern is comparatively large and the band-shaped pattern electrodes are located substantially orthogonal to the orientation direction C of the liquid crystal layer, and therefore, corresponds to the region shown in FIG. 28(e). The third region 353, in which the pitch of the band-shaped pattern electrodes 300a to 300f opposed to the transparent electrode 300 on the peripheral part side of the diffraction pattern is comparatively small and the band-shaped pattern electrodes are located substantially parallel to the orientation direction C of the liquid crystal layer, and therefore, corresponds to the region shown in FIG. 28(c). The fourth region 354, in which the pitch of the band-shaped pattern electrodes 300a to 300f opposed to the transparent electrode 300 on the peripheral part side of the diffraction pattern is comparatively small and the band-shaped pattern electrodes are located substantially orthogonal to the orientation direction C of the liquid crystal layer, and therefore, corresponds to the region shown in FIG. 28(g).

Figure 27C:
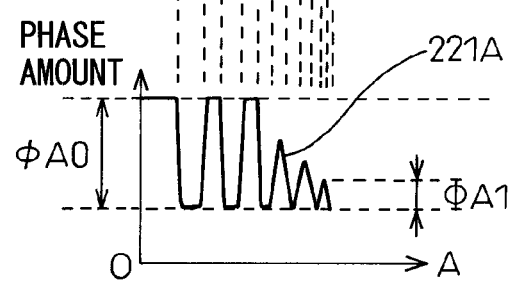
Figure 27D:
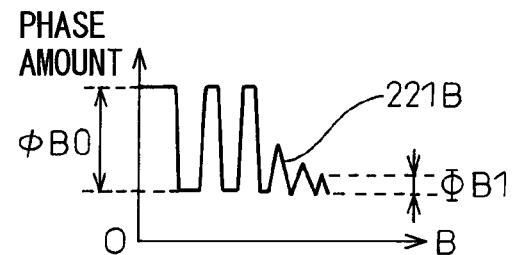

Once a uniform potential difference is generated between the first to fourth regions 351 to 354 and the transparent opposed electrode 350, as shown in FIGS. 27(c) and 27(d), the desired phase difference cannot be obtained for the entire diffraction pattern as a whole.

In view of this, the liquid crystal driving unit 201 shown in FIG. 14 generates a predetermined voltage between the transparent opposed electrode 350 and the transparent electrode 300 including the band-shaped pattern electrodes 300a to 300f in such a manner that V1 is generated between the transparent electrode 300 and the first region 351, V2 between the transparent electrode 300 and the second region 352, V3 between the transparent electrode 300 and the third region 353, and V4 between the transparent electrode 300 and the fourth region 354.

The potential difference generated is proportional to the phase difference, and therefore, it becomes possible to obtain the phase amount distribution not dependent on the orientation direction of the liquid crystal by adjusting the potential difference generated. For example, the potential difference is adjusted to hold the relation V4>V3>V2>V1 in each region.

As shown in FIG. 21(c), upon generation of a larger potential difference on the peripheral part (third region 333) than at the central part (first region 351) in the direction OA, the phase difference φA21 proximate to the phase difference φA20 of the central part can be obtained. As compared with the phase amount distribution 222a with the transparent opposed electrode in non-segmented solid form (the transparent opposed electrode 212 in FIG. 17(a)) as designated by dashed line, therefore, the phase amount distribution 223A with a larger phase difference in the effective light fluxes can be obtained in the case where the transparent opposed electrode 350 shown in FIG. 21(a) is used.

In similar fashion, upon generation of a larger potential difference on the peripheral part (fourth region 354) than in the central part (second region 352) in the direction OB, the phase difference φB21 proximate to the phase difference φB20 of the central part can be obtained. As compared with the phase amount distribution 222B with the non-segmented solid transparent opposed electrode (the transparent opposed electrode 212 in FIG. 17(a)) designated by dashed line, therefore, the phase amount distribution 223B with a large phase difference in the effective light fluxes can be obtained in the case where the transparent opposed electrode 350 shown in FIG. 21(a) is used. Also, by controlling the voltage applied to the third region 353 and the fourth region 354, the relation φA21=φB21 can be obtained.

By adjusting the potential difference in each region as described above, as shown in FIGS. 21(c) to 21(d), the phase difference substantially equal in both the central part and the peripheral part can be generated in both the directions OA and OB. Also, by adjusting the potential difference generated in each region shown in FIG. 21(a) by the liquid crystal driving unit 201 using the liquid crystal panel 21 having the transparent electrode 300 shown in FIG. 17(b), on the other hand, a uniform phase difference can be obtained over the entire range of the effective light fluxes.

Specifically, the applied voltage of the first region 351 is set as V3=2.3 Vrms representing point a on the profile P1 shown in FIG. 20(a), while the applied voltage of the third region 353 is set as V1=3 Vrms representing point e on the profile P3 shown in FIG. 20(b). Also, by setting the similarly obtained V2 and V3 referring to the profiles of the inner peripheral part and the outer peripheral part in the direction OB not shown, a constant diffraction efficiency can be obtained in all the regions phase modulated.

By using the transparent opposed electrode 350, therefore, a common objective lens with the substantially variable focal point can be used, as shown in FIG. 29(b), by preventing the case in which a part of the light beam passed through the diffraction pattern cannot be properly diffracted and effectively used, thereby making it possible to use the light beam effectively.

Next, an example of still another electrode pattern of the liquid crystal optical element is explained.

FIG. 22 is a diagram for explaining still another example of the transparent electrode and the transparent opposed electrode.

FIG. 22(a) is a diagram showing the still another example of the pattern of the transparent opposed electrode 360, FIG. 22(b) shows a pattern example of the transparent electrode 300, FIG. 22(c) shows the phase amount distribution in the direction OA in FIG. 22(b), and FIG. 22(d) a diagram showing the phase amount distribution in the direction OB in FIG. 22(b).

As shown in FIG. 22(a), the transparent opposed electrode 360 is configured of a plurality of band-shaped pattern electrodes 300a to 300f, a lead electrode 360g and gap regions 361a to 361f. As shown in FIG. 22(b), this is also the case with the transparent electrode 300 in opposed relation to the transparent opposed electrode 360. In other words, the transparent electrode 300 and the transparent opposed electrode 360 according to this embodiment have the same pattern and are arranged in opposed relation to each other.

The liquid crystal panel configured this way, as shown in FIG. 22(c), has the phase amount distribution 224A in the direction OA, so that the phase difference in the peripheral part in the direction OA is given as φA31 (the same phase difference λ/2 as the phase amount distribution φA30 of the central part). In the direction OB, on the other hand, as shown in FIG. 22(d), the liquid crystal panel has the phase amount distribution 224B so that the phase difference in the peripheral part in the direction OB is given as φB31. In the peripheral part in the direction OB, the orientation direction C of the liquid crystal is substantially orthogonal to the direction of the band-shaped pattern electrodes, and therefore, the phase difference in the peripheral part is not equal to λ/2 of the phase difference φB30 at the central part.

In the case of FIG. 22, the transparent electrode 300 has the same shape as the transparent opposed electrode 360. As shown by the phase amount distribution 224A and 224B, therefore, the phase difference cannot be λ/2 exactly. Comparison between the phase amount distribution 222A and 222B on the one hand and the phase amount distribution 224A and 224B on the other hand indicated by dashed lines in FIGS. 27(c) and 27(d), however, shows that in the case of FIG. 22, the phase difference can be made closer to the ideal λ/2.

The foregoing description deals with a case in which the gap width of the band-shaped pattern electrodes on the outer peripheral part is corrected in both the transparent electrode 300 and the transparent opposed electrodes 360. As an alternative, the gap width only on the outer peripheral part of the band-shaped pattern electrodes may be corrected in either the transparent electrode 300 or the transparent opposed electrode 360.

Now, the behavior of the liquid crystal on the peripheral part of the diffraction pattern in the case of FIG. 22 is explained.

Figure 23A:
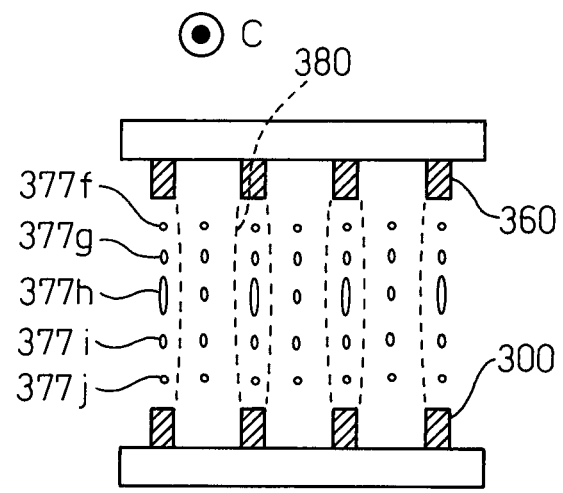
FIG. 23(a) is a diagram for explaining the behavior of the liquid crystal molecules in the section in the peripheral part of a plurality of band-shaped pattern electrodes arranged concentrically in the direction OA, FIG. 23(b) the phase amount distribution 227 corresponding to FIG. 23(a), FIG. 23(c) a diagram for explaining the behavior of the liquid crystal molecules in the section of the peripheral part of a plurality of band-shaped pattern electrodes arranged concentrically in the direction OB, and FIG. 23(d) the phase amount distribution 228 corresponding to FIG. 23(c)
Figure 23B:
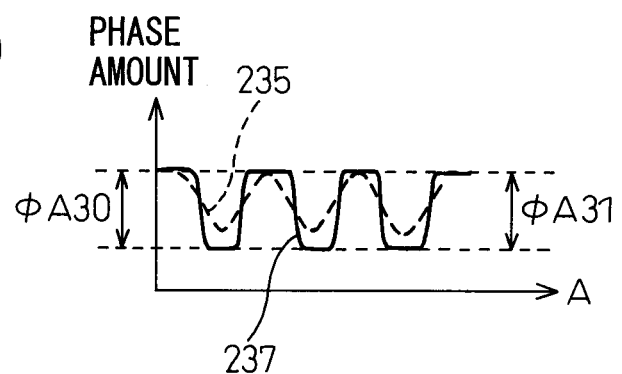

FIG. 23(a) is a diagram for explaining the behavior of the liquid crystal molecules in the section of the peripheral part of a plurality of the band-shaped pattern electrodes arranged concentrically in the direction OA in the liquid crystal panel having the transparent electrode 300 shown in FIG. 22(b). FIG. 23(b) shows the phase amount distribution 227 corresponding to FIG. 23(a). The phase difference in the phase amount distribution 227 is given as φA31. Actually, the band-shaped pattern electrodes are set to have a smaller width and a smaller gap width progressively toward the peripheral part. In FIG. 23(a), however, a plurality of the band-shaped pattern electrodes are drawn to have the same width and arranged at equal intervals for the convenience of explanation.

Upon generation of a predetermined potential difference between the transparent electrode 300 and the transparent opposed electrode 360, the liquid crystal molecules in the shape of long pins, such as those designated by reference numerals 377f, 377g, 377h, 377i and 377j in FIG. 23(a), arranged along the orientation direction C behave to gradually rise. In the process, the gap width is widened as in the case of the liquid crystal panel 210, and therefore, the excessive rise of the liquid crystal molecules in the gap regions can be suppressed. Further, the band-shaped pattern electrodes of the transparent opposed electrode 360 and the transparent electrode 300 are formed at the same position on both sides of the liquid crystal layer, and therefore, the gap regions are affected less by the field leakage 380 from the band-shaped pattern electrodes. As compared with the case (FIG. 19(a)) shown in the liquid crystal panel 210, therefore, the excessive rise of the liquid crystal molecules in the gap regions can be suppressed.

Incidentally, the effect of the field leakage in association with the gap width changes also with the thickness of the liquid crystal layer and the modulus of elasticity of the liquid crystal molecules. Therefore, the gap width is preferably set taking each parameter into consideration.

As described above, the transparent opposed electrode 360 and the transparent electrode 300 have the same electrode pattern. As shown in FIG. 23(a), therefore, the rise of the liquid crystal molecules in the gap regions can be suppressed, and a substantially rectangular phase amount distribution can be obtained while at the same time highlighting the phase difference between the band-shaped pattern electrodes and the gap regions. Thus, comparison between the phase amount distribution 235 designated dashed line in FIG. 23(b) (FIG. 19) and the phase amount distribution 237 shows that the phase difference ϕA31 of the peripheral part almost equal to λ/2 can be obtained in the phase amount distribution 237.

Figure 23C:
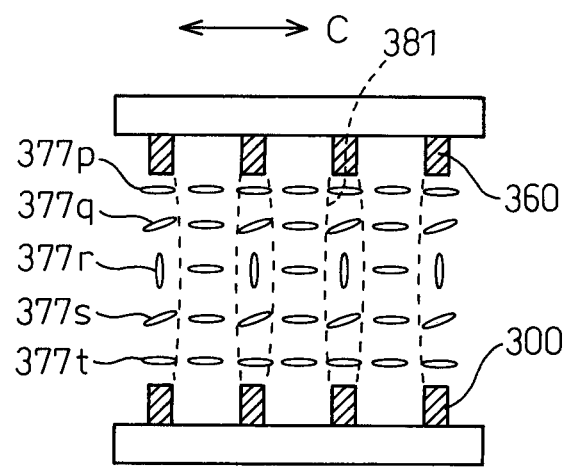
Figure 23D:
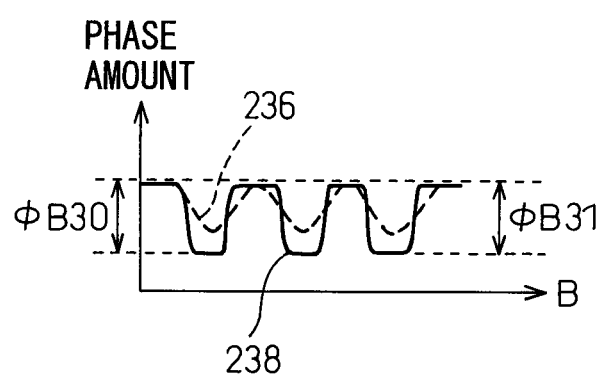
Figure 25A:
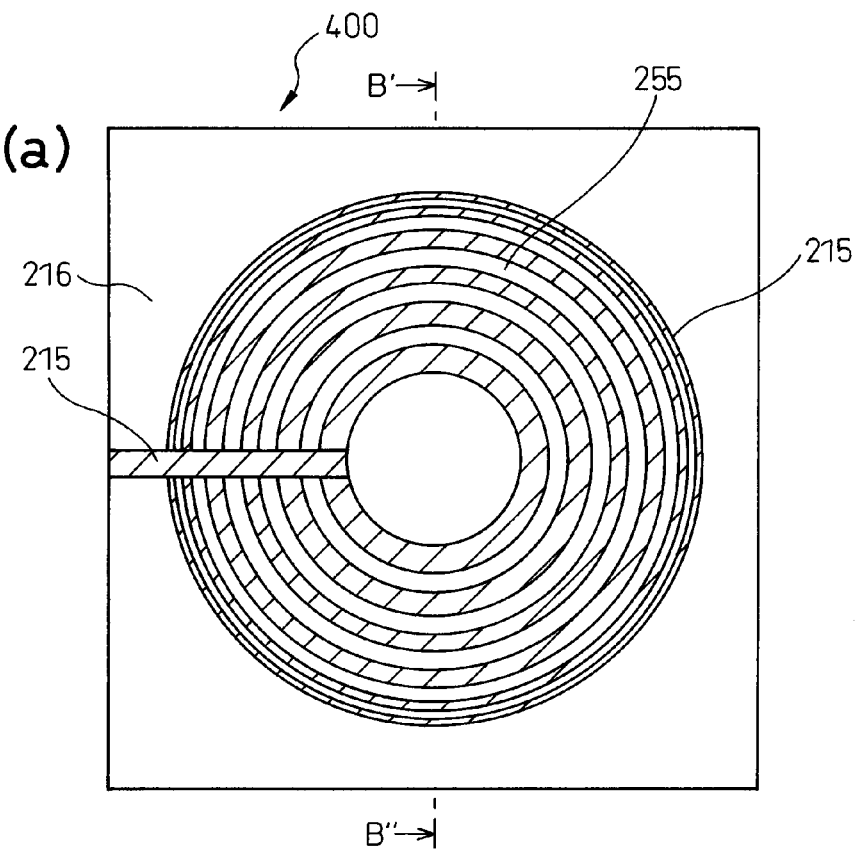
FIG. 25(a) is a diagram for explaining the configuration of the transparent electrode in the liquid crystal panel 400, and FIG. 25(b) a sectional view taken along line B'-B" of one of the transparent substrates making up the liquid crystal panel shown in FIG. 25(a)
Figure 25B:
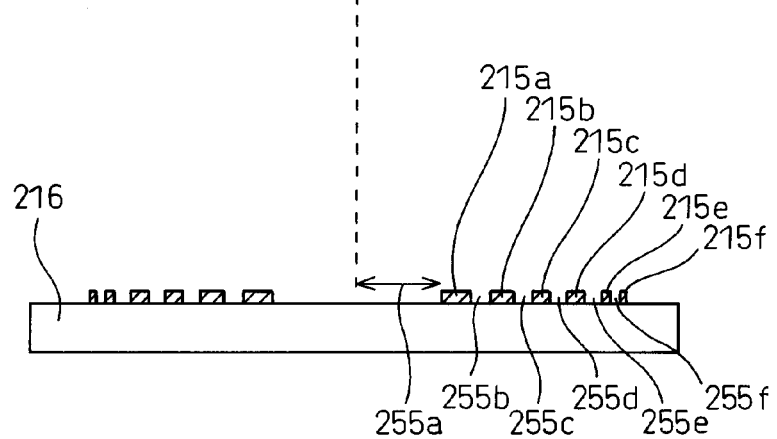

FIG. 23(c) is a diagram for explaining the behavior of the liquid crystal molecules in the section of the peripheral part of a plurality of the band-shaped pattern electrodes arranged concentrically in the direction OB in the liquid crystal panel having the transparent electrode 300 shown in FIG. 23(b). FIG. 23(d) shows the phase amount distribution 238 corresponding to FIG. 23(c). The phase difference in the phase amount distribution 238 is ϕB31.

Upon generation of a predetermined potential difference between the transparent electrode 300 and the transparent opposed electrode 360, the liquid crystal molecules in the shape of long pins, such as those designated by reference numerals 377p, 377q, 377r, 377s and 377t shown in FIG. 23(c), arranged along the orientation direction C begin to behave to rise gradually. Like in FIG. 23(a), the gap width is widened in advance and the transparent electrode 360 and the transparent opposed electrode 360 are formed at the position on both sides of the liquid crystal layer. Therefore, the gap regions are less affected by the field leakage 381. Also, since the orientation direction C of the liquid crystal molecules is substantially orthogonal to the direction in which the band-shaped pattern electrodes are arranged, the rise of the liquid crystal molecules in the gap regions is larger than in the case shown in FIG. 23(a). However, the excessive rise of the liquid crystal molecules in the gap regions is smaller than in the cases shown in FIG. 28(g) and FIG. 19(c).

As shown in FIG. 23(d), the transparent opposed electrode 360 and the transparent electrode 300 have the same electrode pattern, and therefore, the excessive rise of the liquid crystal molecules in the gap regions can be suppressed, and the phase difference between the band-shaped pattern electrodes and the gap regions can be highlighted. Thus, comparison between the phase amount distribution 236 designated dashed line in FIG. 23(d) (FIG. 19(d)) and the phase amount distribution 238 shows that the phase difference ϕA31 in the peripheral part almost closer to about λ/2 can be obtained in the phase amount distribution 238. In this case, due to the difference between the orientation direction of the liquid crystal molecules and the band-shaped pattern electrodes, the phase difference ϕB31 is smaller than λ/2 (λ/2≈ϕA31>ϕB31).

Upon application of a voltage to the liquid crystal layer as described above, the fact that the gap width between the band-shaped pattern electrodes is widened in advance decreases the effect of the field leakage between the adjoining band-shaped pattern electrodes, so that the phase amount distribution with a value closer to the ideal λ/2 of can be obtained. In the case shown in FIG. 22, therefore, the phase amount distribution closer to substantially the rectangle can be obtained, thereby making it possible to obtain the liquid crystal optical element with a higher diffraction efficiency.

As a result, in the case shown in FIG. 22, assuming that a common objective lens is used with the focal point thereof substantially changed, the situation can be prevented in which a part of the light beam passing through the diffraction pattern is not properly diffracted and cannot be effectively utilized, thereby making it possible to use the light effectively.

FIG. 24 is a diagram for explaining an example of the configuration of the transparent electrode 300 and still another transparent opposed electrode. FIG. 24(a) shows an example of the pattern configuration of the transparent opposed electrode 390, and FIG. 24(b) the transparent electrode 300 having the diffraction pattern.

The diffraction pattern of the transparent opposed electrode 390 shown in FIG. 24(a) has a division pattern including four division electrodes 390a to 390x into which a plurality of the band-shaped pattern electrodes arranged concentrically are divided along the dividing lines passing through the center of the band-shaped pattern electrodes. The division electrodes 390a to 390x into which the band-shaped pattern electrodes are divided correspond to the first to fourth regions 351 to 354 of the transparent opposed electrode 390 shown in FIG. 21(a).

The central area of the band-shaped pattern electrodes is configured of the four division electrodes 390a to 390d, the four division electrodes 390e to 390h, the four division electrodes 390i to 390l, the four division electrodes 390m to 390p, the four division electrodes 390q to 390t, and the four division electrodes 390u to 390x into which the band-shaped pattern electrodes are divided, respectively. The configuration of the division patterns shown in FIG. 24(a) is only an example, and the band-shaped pattern electrodes can be further subdivided as required.

The transparent electrode 300 shown in FIG. 24(b) is the same as the transparent electrode 300 shown in FIG. 17(b) and includes the band-shaped pattern electrodes 300a to 300f. Incidentally, the diffraction patterns shown in FIGS. 24(a) and 24(b) are only an example, and the optimum number of the band-shaped pattern electrodes and the optimum width and intervals of the electrodes can be selected in accordance with the system involved in such a manner as to secure the desired values of the radius of curvature of the spherical component of the wave surface shape of the passing light beam. The arrow C in FIG. 24(b) indicates the orientation direction of the liquid crystal layer.

The division areas shown in FIG. 21(a) and the division areas shown in FIG. 24(a) correspond to each other as follows, i.e. the division areas 390a, 390e, 390i, 390c, 390g, 390k are arranged in the first region, the division areas 390b, 390f, 390j, 390d, 390h, 390l in the second region, the division areas 390m, 390q, 390u, 390o, 390s, 390w in the third region, and the division areas 390n, 390r, 390v, 390p, 390t, 390x in the fourth region.

In the case of FIGS. 22(c) and 22(d), the phase difference in the peripheral part of the pattern impressed with a voltage holds the relation ϕA31>ϕB31, and therefore, a uniform phase amount distribution cannot be achieved for the diffraction pattern as a whole. In the case of FIG. 24, on the other hand, the liquid crystal driving unit can apply a predetermined voltage to the transparent electrode 300 and the transparent opposed electrode 390 including the band-shaped pattern electrodes 300a to 300f in such a manner that the voltage V1 is generated between the transparent electrode 300 and the first region, the voltage V2 between the transparent electrode 300 and the second region, the voltage V3 between the transparent electrode 300 and the third region and the voltage V4 between the transparent electrode 300 and the fourth region.

The potential difference generated and the phase difference are proportional to each other. By adjusting the potential difference generated in each region, therefore, the phase difference substantially equal to $\lambda/2$ can be obtained in all the regions. The potential difference in the respective regions can be adjusted to hold the relation V4>V3>V2>V1, for example.

By adjusting the potential difference in this way, the phase difference almost equal to $\lambda/2$ can be generated regardless of whether the phase difference at the central part of the diffraction pattern is ϕA40 or ϕA41 or whether the phase difference in the peripheral part is ϕB40 or ϕ41 in the directions OA and OB as indicated by the phase amount distribution 225A and 225B shown in FIGS. 24(c) and 24(d). Thus, using the liquid crystal panel 210 having the transparent electrode 300 and the transparent opposed electrode 390 having the diffraction pattern shown in FIG. 24, the phase modulation can be carried out with the phase difference of about $\lambda/2$ in the entire range of the effective light fluxes by adjusting the potential difference generated in each region by the liquid crystal driving unit.

In the example shown in FIG. 24, therefore, even in the case where a common objective lens is used by substantially changing the focal point thereof, the situation can be prevented in which a part of the light beam passing through the diffraction pattern fails to be properly diffracted and cannot be effectively used as shown in FIG. 29(b), thereby making it possible to use the light effectively.

What is claimed is:

1. A liquid crystal optical element comprising:
   a liquid crystal panel including:
      a liquid crystal layer provided between a pair of transparent substrates,
      a transparent electrode arranged on one of the pair of the transparent substrates and having electrode elements, and
      a transparent opposed electrode arranged on the other one of the pair of the transparent substrates, one of (1) the electrode elements or (2) the transparent opposed electrode being divided into a plurality of regions; and
   a driving unit generating a potential difference between the transparent electrode and the transparent opposed electrode so as to cause each of the plurality of regions to cause the liquid crystal panel to function as a diffraction element for splitting a light beam passed through the diffraction element into a plurality of light beams which are received on predetermined positions of a photodetector,
   wherein the driving unit adjusts the potential difference between the transparent electrode and the transparent opposed electrode for each of the plurality of the regions so as to generate a phase difference distribution having substantially the same maximum phase amounts in the plurality of regions and substantially the same minimum phase amounts in the plurality of the regions.

2. The liquid crystal optical element according to claim 1, wherein the transparent electrode includes:
   a first electrode region arranged in substantially the same direction as the orientation direction of the liquid crystal layer; and
   a second electrode region arranged substantially in the direction orthogonal to the orientation direction of the liquid crystal layer.

3. The liquid crystal optical element according to claim 1, wherein the transparent electrode includes:
   a first electrode region arranged at a first pitch; and
   a second electrode region arranged at a second pitch different from the first pitch.

4. The liquid crystal optical element according to claim 1, wherein the electrode elements of the transparent electrode are divided into the plurality of regions, the electrode elements being arranged at a plurality of different pitches in the direction substantially the same as the direction of orientation of the liquid crystal layer or the direction substantially orthogonal to the orientation direction of the liquid crystal layer.

5. The liquid crystal optical element according to claim 1, wherein the driving unit generates a blazed phase difference distribution on the liquid crystal panel.

6. An optical pickup apparatus comprising:
   a light source for emitting a light beam; and
   a liquid crystal optical element according to claim 1.

7. An optical pickup apparatus comprising:
   a first light source for emitting a first light beam;
   a second light source for emitting a second light beam;
   a liquid crystal panel including:
      a liquid crystal layer provided between a pair of transparent substrates,
      a transparent electrode arranged on one of the pair of the transparent substrates and having electrode elements, and
      a transparent opposed electrode arranged on the other one of the pair of the transparent substrates, one of (1) the electrode elements or (2) the transparent opposed electrode being divided into a plurality of regions;
   a driving unit generating a potential difference between the transparent electrode and the transparent opposed electrode for each of the plurality of regions;
   a switching unit for switching the driving unit so as to
      cause the liquid crystal layer to function as a diffraction element to split the first light beam from the first light source into a plurality of light beams by generating a phase difference distribution through the liquid crystal panel when the first light beam is emitted from the first light source; or
      cause the liquid crystal layer to function as a nondiffraction element when the second light beam is emitted from the second light source; and
   a photodetector for receiving the light beams split by the liquid crystal panel when the first light beam is emitted from the first light source,
   wherein the driving unit adjusts the potential difference between the transparent electrode and the transparent opposed electrode for each of the plurality of the regions so as to generate a phase difference distribution having substantially the same maximum phase amounts in the plurality of regions and substantially the same minimum phase amounts in the plurality of the regions.

8. The optical pickup apparatus according to claim 7, wherein the photodetector receives the second light beam passed through the liquid crystal panel functioning as a nondiffraction element when the second light beam is emitted from the second light source.

9. The optical pickup apparatus according to claim 7, wherein the first light beam is a light beam for a high-density optical recording medium and the second light beam is a light beam for a selected one of a CD or a DVD.

10. A liquid crystal optical element comprising:
    a liquid crystal panel including:
       a liquid crystal layer provided between a pair of transparent substrates,
       a transparent electrode including first electrode elements having a plurality of band-shaped pattern electrodes arranged concentrically on one of the pair of the transparent substrates, and a transparent opposed electrode arranged on the other one of the pair of the transparent substrates; and wherein the liquid crystal layer is caused to generate a phase amount distribution and function as a binary diffraction grating for a specified wavelength by generating a potential difference between the transparent electrode and the transparent opposed electrode so that the liquid crystal panel is caused to function as a diffraction lens with respect to the light beam transmitted therethrough;

wherein the band-shaped pattern electrodes are arranged at a pitch based on Equation (1) below, $$(2 \times m \times f \times \lambda)^{1/2} \qquad (1)$$

where m is the number of the plurality of the band-shaped pattern electrodes as counted from the center, f is the focal length and $\lambda$ is the wavelength of the light beam used; and wherein a width of the band-shaped pattern electrodes and a width of a gap between the band-shaped pattern electrodes derived from Equation (1) are set to maintain a constant diffraction efficiency in all the regions with the light beam phase modulated.

11. The liquid crystal optical element according to claim 10,
wherein the width of the band-shaped pattern electrodes is set to become smaller progressively as a radius of the band-shaped pattern electrodes becomes greater.

12. The liquid crystal optical element according to claim 10,
wherein the transparent opposed electrode has second electrode elements corresponding to the first electrode elements formed on the transparent electrode and including a plurality of concentrically arranged band-shaped pattern electrodes.

13. The liquid crystal optical element according to claim 10,
wherein the transparent opposed electrode is divided into a plurality of parts by dividing lines passed through the center of the band-shaped pattern electrodes.

14. An optical pickup apparatus comprising:
a light source for emitting a light beam;
an objective lens for leading the light beam to an optical disk; and
a liquid crystal optical element arranged in the light path of the light beam between the light source and the objective lens; the liquid crystal element comprising:
a liquid crystal panel including a liquid crystal layer provided between a pair of transparent substrates,
a transparent electrode including a first electrode element having a plurality of band-shaped pattern electrodes arranged concentrically on one of the pair of the transparent substrates, and
a transparent opposed electrode arranged on the other one of the pair of the transparent substrates;

wherein the liquid crystal layer is caused to generate a phase amount distribution and function as a binary diffraction grating for a specified wavelength by generating potential differences between the transparent electrode and the transparent opposed electrode so that the liquid crystal panel is caused to function as a diffraction lens with respect to the light beam transmitted therethrough;

wherein the band-shaped pattern electrodes are arranged at a pitch based on Equation (1) below, $$(2 \times m \times f \times \lambda)^{1/2} \qquad (1)$$

where m is the number of the plurality of the band-shaped pattern electrodes as counted from the center, f is the focal length and $\lambda$ is the wavelength of the light beam used; and wherein a width of the band-shaped pattern electrodes derived from Equation (1) and a width of a gap between the band-shaped pattern electrodes are set in such a manner that the diffraction efficiency is constant in all the regions with the light beam phase modulated.

* * * * *